US012777445B2

(12) United States Patent
Chong et al.

(10) Patent No.: US 12,777,445 B2
(45) Date of Patent: Oct. 27, 2026

(54) DATA OBTAINING METHOD AND APPARATUS

(71) Applicant: HUAWEI TECHNOLOGIES CO., LTD., Shenzhen (CN)

(72) Inventors: Weiwei Chong, Shenzhen (CN); Xiaobo Wu, Shenzhen (CN); Yang Xin, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 407 days.

(21) Appl. No.: 18/366,535

(22) Filed: Aug. 7, 2023

(65) Prior Publication Data

US 2023/0379854 A1 Nov. 23, 2023

Related U.S. Application Data

(63) Continuation of application No. PCT/CN2021/076074, filed on Feb. 8, 2021.

(51) Int. Cl.
*H04W 60/00* (2009.01)
*H04W 92/02* (2009.01)

(52) U.S. Cl.
CPC ............ *H04W 60/00* (2013.01); *H04W 92/02* (2013.01)

(58) Field of Classification Search
CPC ....... H04L 41/022; H04L 41/14; H04L 41/12; H04W 24/08; H04W 60/00; H04W 88/18; H04W 92/02; H04W 60/04
See application file for complete search history.

(56) References Cited

U.S. PATENT DOCUMENTS

| | | | | |
|---|---|---|---|---|
| 2022/0046101 | A1 * | 2/2022 | Zhang | H04L 41/142 |
| 2022/0329458 | A1 * | 10/2022 | Zhuang | H04L 12/4604 |
| 2022/0337486 | A1 * | 10/2022 | Hong | H04L 41/024 |
| 2022/0369145 | A1 * | 11/2022 | Park | H04W 24/10 |
| 2022/0417799 | A1 * | 12/2022 | Schnitzler | H04W 4/00 |
| 2023/0036993 | A1 * | 2/2023 | Velev | H04W 48/06 |
| 2023/0037802 | A1 * | 2/2023 | Karampatsis | H04W 24/10 |
| 2023/0164877 | A1 * | 5/2023 | Kim | H04W 48/08 370/328 |

(Continued)

FOREIGN PATENT DOCUMENTS

| | | | |
|---|---|---|---|
| CN | 108513726 | A | 9/2018 |
| CN | 110312279 | A | 10/2019 |

OTHER PUBLICATIONS

International Search Report and Written Opinion in International Appln. No. PCT/CN2021/076074, mailed on Oct. 29, 2021, 17 pages (with English translation).

(Continued)

*Primary Examiner* — Khawar Iqbal
(74) *Attorney, Agent, or Firm* — Fish & Richardson P.C.

(57) ABSTRACT

This application provides a data obtaining method and apparatus. The method includes: A data analysis network element in a first network determines that data that needs to be obtained includes to-be-analyzed data in a second network. The data analysis network element sends, to a first network element in the first network, a first request message for requesting to obtain the to-be-analyzed data, where the first request message includes first indication information, and the first indication information indicates that the to-be-analyzed data needs to be obtained from the second network.

20 Claims, 7 Drawing Sheets

(56) References Cited

U.S. PATENT DOCUMENTS

| | | | | |
|---|---|---|---|---|
| 2023/0337089 | A1* | 10/2023 | Ryu | H04W 36/1443 |
| 2023/0345297 | A1* | 10/2023 | Karampatsis | H04L 41/0853 |
| 2023/0379854 | A1* | 11/2023 | Chong | H04W 60/00 |
| 2024/0073709 | A1* | 2/2024 | Karampatsis | H04W 24/02 |

OTHER PUBLICATIONS

3GPP TS 23.288 V16.6.0, "3rd Generation Partnership Project; Technical Specification Group Services and System Aspects; Architecture enhancements for 5G System (5GS) to support network data analytics services (Release 16)," Dec. 2020, 67 pages.

3GPP TR 23.700-91 V17.0.0, "3rd Generation Partnership Project; Technical Specification Group Services and System Aspects; Study on enablers for network automation for the 5G System (5GS); Phase 2 (Release 17)," Dec. 2020, 382 pages.

3GPP TS 23.501 V15.11.0, "3rd Generation Partnership Project; Technical Specification Group Services and System Aspects; System architecture for the 5G System (5GS); Stage 2 (Release 15)," Sep. 2020, 250 pages.

Extended European Search Report in European Appln No. 21923856.5, dated Feb. 15, 2024, 12 pages.

* cited by examiner

DATA OBTAINING METHOD AND APPARATUS

CROSS-REFERENCE TO RELATED APPLICATIONS

This application is a continuation of International Application No. PCT/CN2021/076074, filed on Feb. 8, 2021, the disclosure of which is hereby incorporated by reference in its entirety.

TECHNICAL FIELD

This application relates to the communication field, and more specifically, to a data obtaining method and apparatus.

BACKGROUND

In a 5th generation (5G) communication network, a network data analytics function (NWDAF) network element is introduced to obtain related data of user equipment (UE), a network, an application function (AF) network element, or the like in the 5G network. Specifically, the NWDAF network element can perform training analysis based on a large amount of obtained data, to generate an analysis result. The analysis result can be used to assist in policy formulation and execution in the 5G network. For example, the NWDAF network element generates a service experience analysis result based on network data and AF data. The service experience analysis result can help a policy control network element formulate policy and charging control (PCC) and quality of service (QoS) policies related to a 5G UE service.

In some scenarios (for example, when 5G access and 4th generation (4G) access coexist), the NWDAF network element may need to obtain data in a 4G communication network. Therefore, how the NWDAF network element introduced in 5G obtains the data in the 4G communication network becomes an urgent problem to be resolved.

SUMMARY

This application provides a data obtaining method and apparatus. When determining that to-be-analyzed data in a second network needs to be obtained, a data analysis network element in a first network can obtain the to-be-analyzed data in the second network by using a network element in the first network.

According to a first aspect, a data obtaining method is provided. The data obtaining method may be performed by a data analysis network element, or may be performed by a chip or a circuit disposed in the data analysis network element. This is not limited in this application.

The data obtaining method includes:

The data analysis network element in a first network determines to-be-analyzed data in a second network. The data analysis network element sends a first request message to a first network element in the first network. The first request message is used to request to obtain the to-be-analyzed data. The first request message includes first indication information. The first indication information indicates that the to-be-analyzed data belongs to the second network.

According to the data obtaining method provided in this embodiment of this application, the data analysis network element in the first network determines that data that needs to be obtained includes the to-be-analyzed data in the second network, and the data analysis network element may request, based on the first request message, the first network element in the first network to obtain the to-be-analyzed data. The first indication information is carried in the first request message to notify the first network element that the to-be-analyzed data that needs to be obtained needs to be obtained from the second network, so that the data analysis network element obtains to-be-analyzed data corresponding to a network different from a network to which the data analysis network element belongs.

With reference to the first aspect, in some implementations of the first aspect, the first indication information includes at least one of the following information: data type information of the to-be-analyzed data in the second network, network type information of the second network, network identification information of the second network, area information corresponding to the second network, or information about a second network element in the second network. The second network element is configured to provide the to-be-analyzed data.

With reference to the first aspect, in some implementations of the first aspect, when the first indication information indicates the information about the second network element, the method further includes: The data analysis network element determines, based on a correspondence between obtained historical data in the second network and a network element in the second network, the second network element that can provide the to-be-analyzed data.

In this embodiment of this application, the first indication information may be in a plurality of forms. This improves flexibility of the solution.

With reference to the first aspect, in some implementations of the first aspect, the first network element includes an access and mobility management function (AMF) network element, and the second network element includes a mobility management entity (MME) that has an interaction interface with the AMF network element. Alternatively, the first network element includes a session management function (SMF) network element, and the second network element includes a packet data network gateway network element co-located with the SMF network element.

In this embodiment of this application, the first network element may be the AMF network element, and the second network element may be the MME network element that has the interaction interface with the AMF network element. Alternatively, the first network element may be the SMF network element, and the second network element may be the packet data network gateway network element co-located with the SMF network element. It is noted that specific network element types of the first network element and the second network element may be in a plurality of possible forms. This improves flexibility of the solution.

With reference to the first aspect, in some implementations of the first aspect, the method includes: The data analysis network element determines the first network element. The first network element is configured to obtain the to-be-analyzed data from the second network.

With reference to the first aspect, in some implementations of the first aspect, that the data analysis network element determines the first network element includes: The data analysis network element determines data type information corresponding to the to-be-analyzed data, and the data analysis network element determines the first network element based on the data type information.

With reference to the first aspect, in some implementations of the first aspect, that the data analysis network element determines data type information corresponding to the to-be-analyzed data includes: The data analysis network element determines, based on identification information, the data type information corresponding to the to-be-analyzed data. The identification information indicates a type of a data analysis task performed by the data analysis network element.

With reference to the first aspect, in some implementations of the first aspect, the method further includes: The data analysis network element receives a second request message from a consumer network element, where the second request message is used to request the data analysis network element to perform data analysis, and the second request message includes the identification information. Alternatively, the data analysis network element determines the identification information based on a pre-configured task. The pre-configured task indicates a data analysis type corresponding to the identification information.

According to the data obtaining method provided in this embodiment of this application, the data analysis network element may determine the identification information based on the pre-configured task, or may further determine the identification information based on the received second request message, thereby improving flexibility of the solution.

With reference to the first aspect, in some implementations of the first aspect, the second request message further includes second indication information, and the second indication information indicates at least one of the following: the area information corresponding to the second network, the network type information of the second network, or the network identification information of the second network.

With reference to the first aspect, in some implementations of the first aspect, that the data analysis network element determines to-be-analyzed data in a second network includes: The data analysis network element determines, based on the second indication information, that to-be-obtained data includes the to-be-analyzed data in the second network.

According to the data obtaining method provided in this embodiment of this application, the data analysis network element may determine, based on the second indication information, that the data that needs to be obtained includes the to-be-analyzed data in the second network, and the second indication information may be in a plurality of specific forms. This improves flexibility of the solution.

With reference to the first aspect, in some implementations of the first aspect, that the data analysis network element determines the first network element includes: The data analysis network element determines network element type information of the first network element, and the data analysis network element determines the first network element based on the network element type information of the first network element.

According to the data obtaining method provided in this embodiment of this application, the data analysis network element may determine the first network element based on the data type information corresponding to the to-be-analyzed data or the network element type information of the first network element. This improves flexibility of the solution.

With reference to the first aspect, in some implementations of the first aspect, that the data analysis network element determines the first network element includes: The data analysis network element determines that the first network element meets a preset condition. The preset condition includes at least one of the following: having an interaction interface with a network element in the second network, being co-located with the network element in the second network, or being associated with the area information corresponding to the second network.

With reference to the first aspect, in some implementations of the first aspect, the preset condition further includes area information corresponding to the first network.

With reference to the first aspect, in some implementations of the first aspect, when the preset condition is the area information corresponding to the first network, the method further includes: The data analysis network element determines, based on a preset area mapping relationship and the area information corresponding to the second network, the area information corresponding to the first network. The preset area mapping relationship indicates the area information that corresponds to the second network and that is associated with the area information corresponding to the first network.

According to the data obtaining method provided in this embodiment of this application, the data analysis network element may select, from a plurality of network elements included in a network element type, a network element that meets the preset condition as the first network element, so that the network element that meets the condition can be filtered out. This improves accuracy of the solution.

With reference to the first aspect, in some implementations of the first aspect, that the data analysis network element determines the first network element based on the network element type further includes: The data analysis network element determines that the first network element includes all network elements in the network element type corresponding to the network element type information.

With reference to the first aspect, in some implementations of the first aspect, that the data analysis network element determines the first network element includes: The data analysis network element sends a third request message to a network repository function network element in the first network. The third request message is used to request the network repository function network element to provide information about the first network element, and the third request message includes the preset condition. The data analysis network element receives a third response message from the network repository function network element. The third response message includes the information about the first network element.

According to the data obtaining method provided in this embodiment of this application, the data analysis network element may obtain the information about the first network element by using the network repository function network element, or the data analysis network element may determine the first network element by itself. This improves flexibility of the solution.

With reference to the first aspect, in some implementations of the first aspect, the first network includes a 5th generation 5G network, and the second network includes a 4th generation 4G network.

According to the data obtaining method provided in this embodiment of this application, the first network may be 5G, and the second network may be 4G. In other words, according to the data obtaining method provided in this embodiment of this application, the data analysis network element introduced in 5G can obtain data in the 4G communication network.

According to a second aspect, a data obtaining method is provided. The data obtaining method may be performed by a first network element, or may be performed by a chip or a circuit disposed in the first network element. This is not limited in this application.

The data obtaining method includes:

The first network element in a first network receives a first request message from a data analysis network element. The first request message is used to request to obtain to-be-analyzed data, the first request message includes first indication information, and the first indication information indicates that the to-be-analyzed data belongs to a second network. The first network element obtains the to-be-analyzed data from a second network element in the second network based on the first indication information. The second network element includes a network element having an interaction interface with the first network element and/or a network element co-located with the first network element.

According to the data obtaining method provided in this embodiment of this application, the first network element in the first network obtains the to-be-analyzed data from the second network element in the second network based on the first indication information in the first request message sent by the data analysis network element in the first network, so that the data analysis network element obtains to-be-analyzed data corresponding to a network different from a network to which the data analysis network element belongs.

With reference to the second aspect, in some implementations of the second aspect, the first indication information includes at least one of the following information: data type information of the to-be-analyzed data in the second network, network type information of the second network, network identification information of the second network, area information corresponding to the second network, or information about the second network element in the second network. The second network element is configured to provide the to-be-analyzed data.

In this embodiment of this application, the first indication information may be in a plurality of forms. This improves flexibility of the solution.

With reference to the second aspect, in some implementations of the second aspect, the method further includes: The first network element sends a registration request message to a network repository function network element in the first network. The registration request message includes at least one of the following information: area information corresponding to the second network, area information corresponding to the first network, information about the interaction interface between the second network element and the first network element, or information about the second network element co-located with the first network element.

With reference to the second aspect, in some implementations of the second aspect, the method further includes: The first network element determines that the second network element is a network element meeting a preset condition in the second network. The preset condition includes at least one of the following: having an interaction interface with a network element in the second network, being co-located with the network element in the second network, or being associated with the area information corresponding to the second network.

According to the data obtaining method provided in this embodiment of this application, the first network element may select the network element that meets the preset condition as the second network element, so that the network element that meets the condition can be filtered out. This improves accuracy of the solution.

With reference to the second aspect, in some implementations of the second aspect, the method further includes: The first network element receives the to-be-analyzed data from the second network element, and the first network element sends the to-be-analyzed data to the data analysis network element.

According to a third aspect, a data obtaining method is provided. The data obtaining method may be performed by a second network element, or may be performed by a chip or a circuit disposed in the second network element. This is not limited in this application.

The data obtaining method includes:

The second network element in a second network receives a fourth request message from a first network element in a first network. The fourth request message is used to obtain to-be-analyzed data, and the fourth request message includes data type information of the to-be-analyzed data in the second network. The second network element sends the to-be-analyzed data to the first network element. The second network element includes a network element having an interaction interface with the first network element, and/or a network element co-located with the first network element.

With reference to the third aspect, in some implementations of the third aspect, the fourth request message further includes at least one piece of information of network type information of the second network, network identification information of the second network, and area information corresponding to the second network.

With reference to the third aspect, in some implementations of the third aspect, the first network element includes an access and mobility management function (AMF) network element, and the second network element includes a mobility management entity (MME) that has an interaction interface with the AMF network element. Alternatively, the first network element includes a session management function (SMF) network element, and the second network element includes a packet data network gateway network element co-located with the SMF network element.

According to a fourth aspect, a data obtaining method is provided. The data obtaining method may be performed by a network repository function network element, or may be performed by a chip or a circuit disposed in the network repository function network element. This is not limited in this application.

The data obtaining method includes:

The network repository function network element in a first network receives a registration request message from a first network element in the first network. The registration request message includes at least one of the following information:

area information corresponding to the second network, area information corresponding to the first network, information about an interaction interface between a second network element and the first network element, or information about the second network element co-located with the first network element.

With reference to the fourth aspect, in some implementations of the fourth aspect, the method further includes: The repository function network element receives a third request message from a data analysis network element in the first network. The third request message is used to request the network repository function network element to provide information about the first network element, and the third request message includes a preset condition. The network repository function network element sends a third response message to the data analysis network element. The third response message includes the information about the first network element, and the preset condition includes at least one of the following: having an interaction interface with a network element in the second network, being co-located with the network element in the second network, or being associated with the area information corresponding to the second network.

With reference to the fourth aspect, in some implementations of the fourth aspect, the third request message further includes network element type information of the first network element.

According to a fifth aspect, a data obtaining apparatus is provided. The data obtaining apparatus includes a processor, configured to implement functions of a data analysis network element used in the method described in the first aspect.

In a possible implementation, the data obtaining apparatus may further include a memory. The memory is coupled to the processor. The processor is configured to implement the functions of the data analysis network element used in the method described in the first aspect.

In a possible implementation, the memory is configured to store program instructions and data. The memory is coupled to the processor. The processor may invoke and execute the program instructions stored in the memory, to implement the functions of the data analysis network element used in the method described in the first aspect.

In a possible implementation, the data obtaining apparatus may further include a communication interface. The communication interface is used by the data obtaining apparatus to communicate with another device. The communication interface may be a transceiver, an input/output interface, a circuit, or the like.

In a possible design, the data obtaining apparatus includes a processor and a communication interface.

The processor is configured to run a computer program, so that the data obtaining apparatus implements any method described in the first aspect.

The processor communicates with the outside through the communication interface.

It may be understood that the outside may be an object other than the processor, or an object other than the apparatus.

In another possible design, the data obtaining apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

According to a sixth aspect, a data obtaining apparatus is provided. The data obtaining apparatus includes a processor, configured to implement functions of a first network element used in the method described in the second aspect.

In a possible implementation, the data obtaining apparatus may further include a memory. The memory is coupled to the processor. The processor is configured to implement the functions of the first network element used in the method described in the second aspect.

In a possible implementation, the memory is configured to store program instructions and data. The memory is coupled to the processor. The processor may invoke and execute the program instructions stored in the memory, to implement the functions of the first network element used in the method described in the second aspect.

In a possible implementation, the data obtaining apparatus may further include a communication interface. The communication interface is used by the data obtaining apparatus to communicate with another device. The communication interface may be a transceiver, an input/output interface, a circuit, or the like.

In a possible design, the data obtaining apparatus includes a processor and a communication interface.

The processor communicates with the outside through the communication interface.

The processor is configured to run a computer program, so that the data obtaining apparatus implements any method described in the second aspect.

It may be understood that the outside may be an object other than the processor, or an object other than the apparatus.

In another possible design, the data obtaining apparatus is a chip or a chip system. The communication interface may be an input/output interface, an interface circuit, an output circuit, an input circuit, a pin, a related circuit, or the like in the chip or chip system. The processor may alternatively be a processing circuit or a logic circuit.

According to a seventh aspect, a data obtaining apparatus is provided. The data obtaining apparatus includes a processor, configured to implement functions of a second network element used in the method described in the third aspect.

In a possible implementation, the data obtaining apparatus may further include a memory. The memory is coupled to the processor. The processor is configured to implement the functions of the second network element used in the method described in the third aspect.

In a possible implementation, the memory is configured to store program instructions and data. The memory is coupled to the processor. The processor may invoke and execute the program instructions stored in the memory, to implement the functions of the second network element used in the method described in the third aspect.

In a possible implementation, the data obtaining apparatus may further include a communication interface. The communication interface is used by the data obtaining apparatus to communicate with another device. The communication interface may be a transceiver, an input/output interface, a circuit, or the like.

In a possible design, the data obtaining apparatus includes a processor and a communication interface.

The processor communicates with the outside through the communication interface.

The processor is configured to run a computer program, so that the data obtaining apparatus implements any method described in the third aspect.

It may be understood that the outside may be an object other than the processor, or an object other than the apparatus.

In another possible design, the data obtaining apparatus is a chip or a chip system. The communication interface may be an input/output interface, an interface circuit, an output circuit, an input circuit, a pin, a related circuit, or the like in the chip or chip system. The processor may alternatively be a processing circuit or a logic circuit.

According to an eighth aspect, a data obtaining apparatus is provided. The data obtaining apparatus includes a processor, configured to implement functions of a network repository function network element used in the method described in the fourth aspect.

In a possible implementation, the data obtaining apparatus may further include a memory. The memory is coupled to the processor. The processor is configured to implement the functions of the network repository function network element used in the method described in the fourth aspect.

In a possible implementation, the memory is configured to store program instructions and data. The memory is coupled to the processor. The processor may invoke and execute the program instructions stored in the memory, to implement the functions of the network repository function network element used in the method described in the fourth aspect.

In a possible implementation, the data obtaining apparatus may further include a communication interface. The communication interface is used by the data obtaining apparatus to communicate with another device. The communication interface may be a transceiver, an input/output interface, a circuit, or the like.

In a possible design, the data obtaining apparatus includes a processor and a communication interface.

The processor communicates with the outside through the communication interface.

The processor is configured to run a computer program, so that the data obtaining apparatus implements any method described in the fourth aspect.

It may be understood that the outside may be an object other than the processor, or an object other than the apparatus.

In another possible design, the data obtaining apparatus is a chip or a chip system. The communication interface may be an input/output interface, an interface circuit, an output circuit, an input circuit, a pin, a related circuit, or the like in the chip or chip system. The processor may alternatively be a processing circuit or a logic circuit.

According to a ninth aspect, this application provides a computer-readable storage medium. The computer-readable storage medium stores instructions, and when the instructions are run on a computer, the computer is enabled to perform the methods in the foregoing aspects.

According to a tenth aspect, this application provides a computer program product including instructions. When the computer program product runs on a computer, the computer is enabled to perform the methods in the foregoing aspects.

According to an eleventh aspect, a communication system is provided, including the data obtaining apparatus shown in the fifth aspect and the data obtaining apparatus shown in the sixth aspect.

According to a twelfth aspect, a communication system is provided, including the data obtaining apparatus shown in the fifth aspect to the data obtaining apparatus shown in the eighth aspect.

According to a thirteenth aspect, a chip or a chip system is provided. The chip or the chip system includes at least one processor and a communication interface. The communication interface and the at least one processor are interconnected through a line. The at least one processor is configured to run a computer program or instructions, to perform the method in any one of the first aspect to the fourth aspect and the possible implementations of the first aspect to the fourth aspect. The communication interface in the chip may be an input/output interface, a pin, a circuit, or the like.

In a possible implementation, the chip or the chip system described in this application further includes at least one memory, and the at least one memory stores instructions. The memory may be a storage unit inside the chip, for example, a register or a cache, or may be a storage unit (for example, a read-only memory or a random access memory) of the chip.

DESCRIPTION OF EMBODIMENTS

The following describes technical solutions of this application with reference to accompanying drawings.

Figure 1:
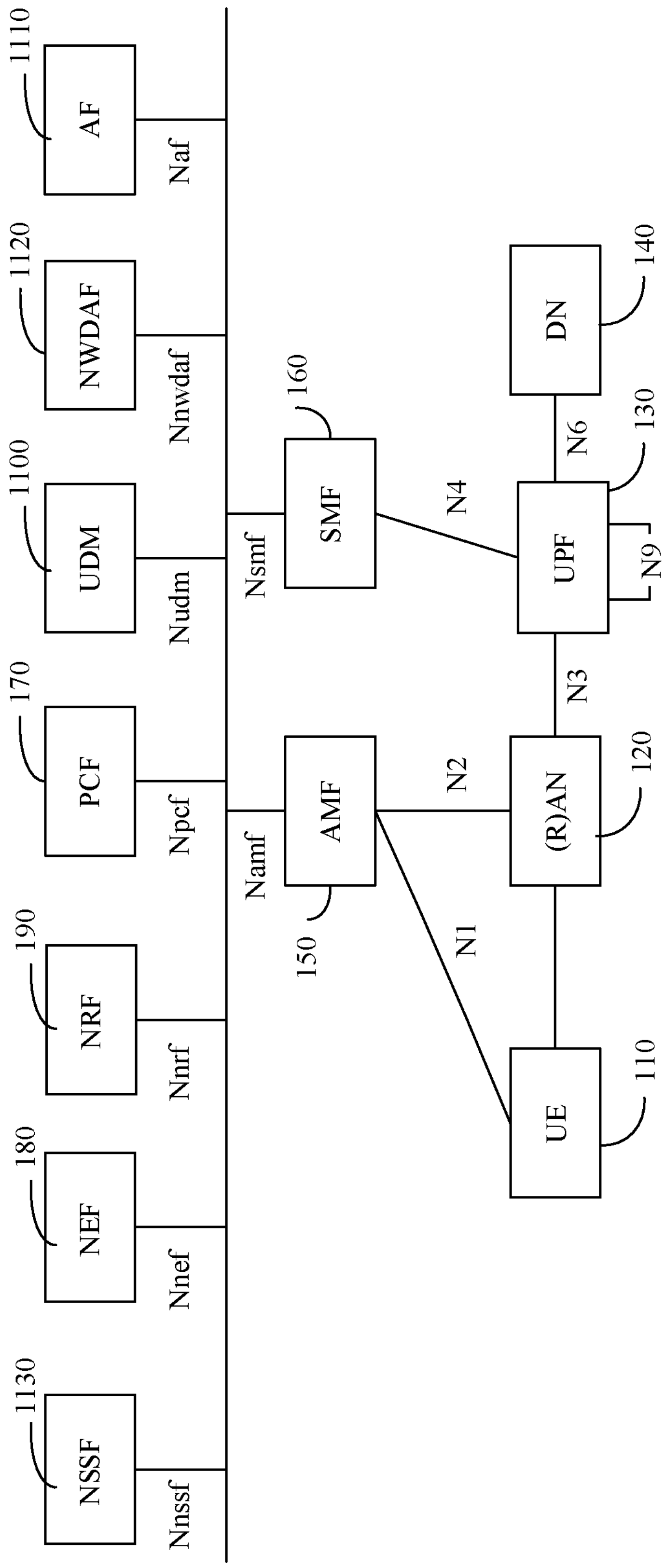
FIG. 1 is a schematic diagram of a network architecture based on a service-oriented interface according to an embodiment of this application.

FIG. 1 is a schematic diagram of a network architecture based on a service-oriented interface according to an embodiment of this application. The following separately describes each part in the network architecture shown in FIG. 1.

1. User equipment (UE) 110 may include various handheld devices having a wireless communication function, vehicle-mounted devices, wearable devices, computing devices, or other processing devices connected to a wireless modem, and various forms of terminals, mobile stations (MSs), terminals, soft clients, and the like. For example, the UE 110 may be a water meter, an electricity meter, or a sensor.

For example, the user equipment in embodiments of this application may be an access terminal, a subscriber unit, a subscriber station, a mobile station, a mobile console, a relay station, a remote station, a remote terminal, a mobile device, a user terminal, terminal equipment, a wireless communication device, a user agent, or a user apparatus. The user equipment may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, user equipment in a 5G network, user equipment in a future evolved public land mobile network (PLMN), user equipment in a future internet of vehicles, or the like. This is not limited in embodiments of this application.

By way of example, and not limitation, in embodiments of this application, the wearable device may alternatively be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the user equipment in embodiments of this application may alternatively be user equipment in an internet of things (IoT) system. An IoT is an important part of development of future information technologies. A main technical feature of the IoT is to connect an object to a network by using a communication technology, to implement an intelligent network of human-machine interconnection and thing-thing interconnection. In embodiments of this application, an IoT technology may implement massive connections, deep coverage, and terminal power saving by using, for example, a narrow band (NB) technology. In addition, in embodiments of this application, the user equipment may further include sensors such as a smart printer, a train detector, and a gas station. Main functions include collecting data (some user equipment), receiving control information and downlink data of an access network device, sending an electromagnetic wave, and transmitting uplink data to the access network device.

2. A (radio) access network ((R)AN) device 120 is configured to provide a network access function for authorized user equipment in a specific area, and can use transmission tunnels with different quality based on user equipment levels, service requirements, and the like.

The (R)AN can manage radio resources and provide an access service for user equipment, to forward a control signal and user equipment data between the user equipment and a core network. The (R)AN may also be understood as a base station in a conventional network.

For example, the access network device in embodiments of this application may be any communication device that has a wireless transceiver function and that is configured to communicate with the user equipment. The access network device includes but is not limited to an evolved nodeB (eNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the access network device may be a gNB or a transmission point (TRP or TP) in a 5G system such as an NR system, may be one antenna panel or a group of antenna panels (including a plurality of antenna panels) of a base station in a 5G system, or may be a network node, such as a baseband unit (BBU) or a distributed unit (DU), that constitutes a gNB or a transmission point.

In some deployments, a gNB may include a central unit (CU) and a DU. The gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be classified as an access network device in a radio access network (RAN), or the CU may be classified as an access network device in a core network (CN). This is not limited in this application.

3. A user plane network element 130 is configured to perform packet routing and forwarding, quality of service (QoS) processing on user plane data, and the like.

In a 5G communication system, the user plane network element may be a user plane function (UPF) network element. In a future communication system, the user plane network element may still be the UPF network element, or may have another name. This is not limited in this application.

4. A data network 140 is used to provide a network for data transmission.

In a 5G communication system, the data network may be a data network (DN). In a future communication system, the data network may still be the DN, or may have another name. This is not limited in this application.

5. An access management network element 150 is mainly used for mobility management, access management, and the like, and may be configured to implement functions, for example, access authorization/authentication, other than session management in functions of a mobility management entity (MME).

In a 5G communication system, the access management network element may be an access and mobility management function (AMF) network element. In a future communication system, the access management network element may still be the AMF network element, or may have another name. This is not limited in this application.

6. A session management network element 160 is mainly configured to manage a session, assign and manage an internet protocol (IP) address of a terminal device, select an endpoint that can manage a user plane function interface and a policy control and charging function interface, notify downlink data, and the like.

In a 5G communication system, the session management network element may be a session management function (SMF) network element. In a future communication system, the session management network element may still be the SMF network element, or may have another name. This is not limited in this application.

7. A policy control network element 170 is configured to: guide a unified policy framework of network behavior, and provide policy rule information for a network element (for example, the AMF or SMF network element) or the terminal device.

In a 4G communication system, the policy control network element may be a policy and charging rules function (PCRF) network element. In a 5G communication system, the policy control network element may be a policy control function (PCF) network element. In a future communication system, the policy control network element may still be the PCF network element, or may have another name. This is not limited in this application.

8. A network exposure network element 180 is mainly configured to support capability and event exposure.

In a 5G communication system, the network exposure network element may be a network exposure function (NEF) network element. In a future communication system, the network exposure network element may still be the NEF network element, or may have another name. This is not limited in this application.

9. A network repository network element 190 is configured to maintain information of all network function services in a network.

In a 5G communication system, the network repository network element may be a network repository function (NRF) network element. In a future communication system, the network repository network element may still be the NRF network element, or may have another name. This is not limited in this application.

10. A data management network element 1100 is configured to process a terminal device identifier, perform access authentication, registration, and mobility management, and the like.

In a 5G communication system, the data management network element may be a unified data management (UDM) network element. In a future communication system, the unified data management network element may still be the UDM network element, or may have another name. This is not limited in this application.

11. An application network element 1110 is configured to perform application-affected data routing, access a network exposure function network element, interact with a policy framework to perform policy control, and the like.

In a 5G communication system, the application network element may be an application function (AF) network element. In a future communication system, the application network element may still be the AF network element, or may have another name. This is not limited in this application.

12. A data analysis network element 1120 is configured to implement a network data analytics function.

The data analysis network element may be an independent network element, may be a combination of a plurality of network elements, or may be co-located with another network element.

In a 5G communication system, the data analysis network element may be a network data analytics function (NWDAF) network element. In a future communication system, the data analysis network element may still be the NWDAF network element, or may have another name. This is not limited in this application.

13. A network slice selection network element 1130 is configured to select a network slice instance that serves user equipment.

In a 5G communication system, the network slice selection network element may be a network slice selection function (NSSF) network element. In a future communication system, the network slice selection function network element may still be the NSSF network element, or may have another name. This is not limited in this application.

It may be understood that the foregoing network elements or functions may be network elements in a hardware device, software functions running on dedicated hardware, or virtualized functions instantiated on a platform (for example, a cloud platform).

For ease of description, an example in which the access and mobility management function network element is an AMF network element, the data analysis network element is an NWDAF network element, and the network storage network element is an NRF network element is used for subsequent descriptions in this application.

Further, the AMF network element is briefly referred to as an AMF, the NWDAF network element is briefly referred to as an NWDAF, and the NRF network element is briefly referred to as an NRF. In other words, in subsequent descriptions in this application, all AMFs may be replaced with access and mobility management function network elements, all NWDAFs may be replaced with data analysis function network elements, and all NRFs may be replaced with network repository network elements.

For ease of description, in this application, a data obtaining method is described by using an example in which an apparatus is an AMF entity, an NWDAF entity, or an NRF entity. For an implementation method in which the apparatus is a chip in the AMF entity, a chip in the NWDAF entity, or a chip in the NRF entity, refer to specific descriptions in which the apparatus is the AMF entity, the NWDAF entity, or the NRF entity. Details are not described again.

In the network architecture shown in FIG. 1, the terminal device is connected to the AMF through an N1 interface, the RAN is connected to the AMF through an N2 interface, and the RAN is connected to the UPF through an N3 interface.

UPFs are connected to each other through an N9 interface, and the UPF is interconnected to a data network (DN) through an N6 interface.

The SMF controls the UPF through the N4 interface.

An NSSF accesses a service-based interface through an Nnssf interface to provide a corresponding service. Similarly, the NRF, PCF, UDM, NWDAF, and AF access the service-oriented interface through respective interfaces to provide corresponding services.

In FIG. 1, Nnef, Nnrf, Npcf, Nudm, Nnwdaf, Naf, Namf, Nsmf, Nnssf, N1, N2, N3, N4, and N6 are interface sequence numbers. For meanings of these interface sequence numbers, refer to meanings defined in the 3rd generation partnership project (3GPP) standard protocol. This is not limited herein.

It should be noted that names of the network elements and the communication interfaces between the network elements in FIG. 1 are briefly described by using an example specified in a current protocol, but embodiments of this application are not limited to being applied only to a currently known communication system. Therefore, standard names used when the current protocol is used as an example for description are all function descriptions. A specific name of a network element, an interface, signaling, or the like is not limited in this application, and only represents a function of the network element, the interface, or the signaling, and may be correspondingly extended to another system, for example, a 2G, 3G, 4G, or future communication system.

In addition, it should be further noted that in some network architectures, network function network elements and entities such as the AMF network element, the SMF network element, the PCF network element, the BSF network element, and the UDM network element are all referred to as network function (NF) network elements. Alternatively, in some other network architectures, a set of network elements such as the AMF network element, the SMF network element, the PCF network element, the BSF network element, and the UDM network element may be referred to as a control plane function network element.

FIG. 1 is the schematic diagram of the 5G network architecture based on the service-oriented interface. In this embodiment of this application, the NWDAF network element shown in FIG. 1 can obtain data in a 4G communication network.

For example, at the early stage of 5G commercial use, when there are a small number of 5G network users and a large number of 4G network users, the NWDAF needs to obtain related data of users in the 4G network. For example, to obtain personnel track information, the NWDAF needs to analyze track information of the 4G users in addition to track information of the 5G users. Therefore, the NWDAF needs to obtain related data such as user locations in the 4G network.

Figure 2:
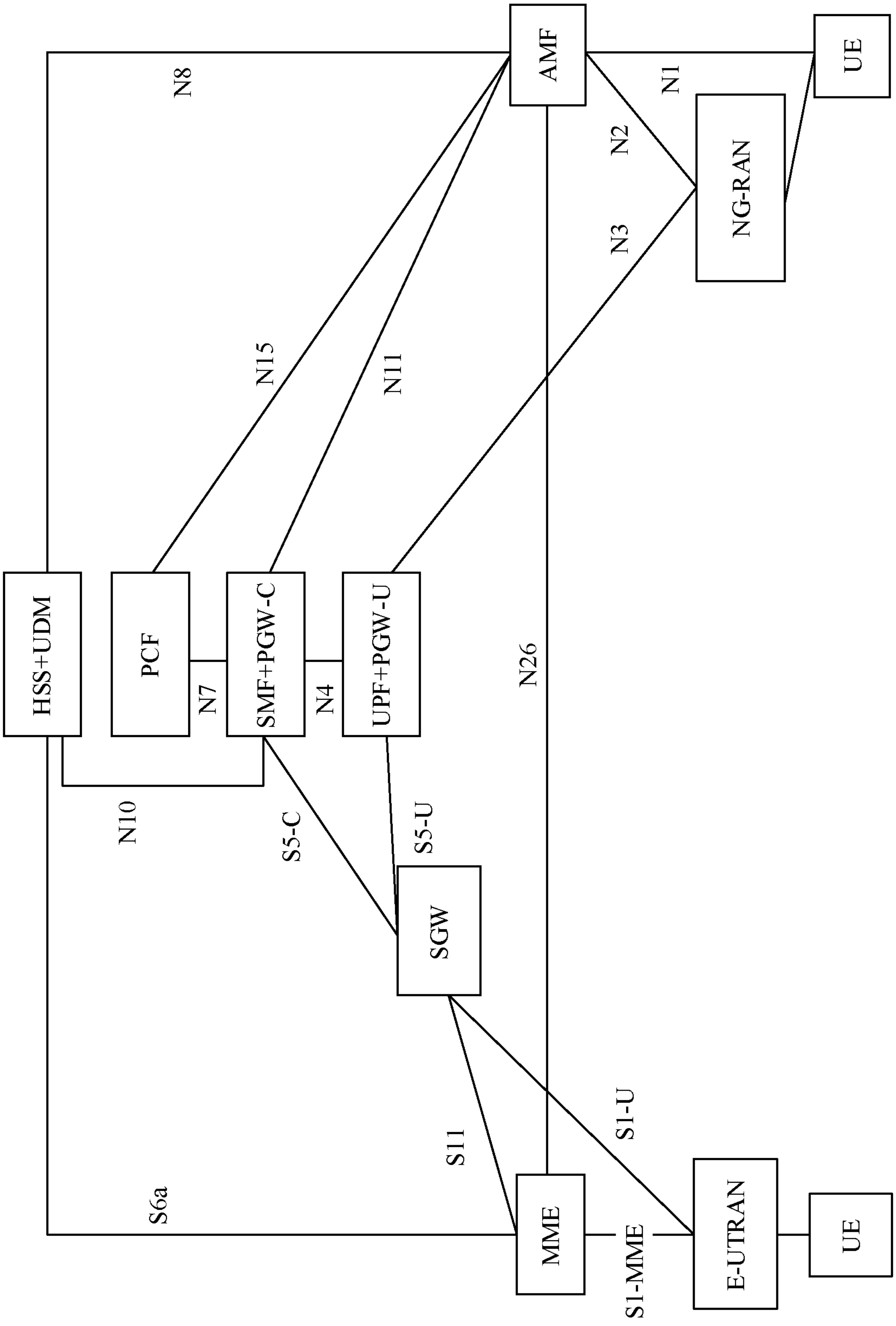
FIG. 2 is a schematic diagram of a network architecture for interaction between 5G and 4G according to this application.

For another example, when 5G access and 4G access coexist, to balance user capacity of the two networks and ensure user service experience in the two networks, the NWDAF needs to learn of 5G access data and service data of UE, and also needs to obtain 4G access data and service data of UE. The following briefly describes interaction between 5G and 4G with reference to FIG. 2. FIG. 2 is a schematic diagram of a network architecture for interaction between 5G and 4G according to this application.

It can be learned from FIG. 2 that the 5G network implements interaction with the 4G network by co-locating a network element (as shown in FIG. 2, an SMF and a PGW-C are co-located, a UDM and a home subscriber server (HSS) are co-located, or the like) in the 5G network and the 4G network and/or enabling an interactive interface (as shown in FIG. 2, an N26 interface is enabled between an AMF and an MME).

Specifically, an evolved UMTS terrestrial radio access network (E-UTRAN) shown in FIG. 2 is an access network device in the 4G network, an NG-RAN is an access network device in the 5G network, an HSS is a server in the 4G network and configured to store user subscription information, a serving gateway (SGW) is a user plane access serving gateway in the 4G network, a packet data network gateway control plane (PGW-C) network element and a packet data network gateway user plane (PGW-U) network element are network elements in the 4G network that are responsible for connecting user equipment to an external network, and further undertake functions such as session management and bearer control of a mobile phone, IP address allocation, and charging support.

It should be noted that interface names (for example, S1-MME, S1-U, S11, N26, N3, N1, N2, N11, S11, S5-U, S5-C, N15, N8, N10 and S6a shown in FIG. 2) shown in FIG. 2 are merely examples and do not constitute any limitation on the protection scope of this application.

For example, the NWDAF may obtain, from an NF by using a data openness service provided by the NF (for example, the AMF, the SMF, or an AF), data corresponding to a specific data type. According to the currently provided technical solution, the NWDAF can obtain data of the NF in the 5G network. There is no related technical support for how to obtain data in the 4G communication network. In addition, for the NWDAF, there is no direct interface between a 5G network element and a 4G network element (for example, the MME, a PGW, or the SGW). In addition, the 5G network uses a service-based architecture, and the 4G network uses a point-to-point interface architecture. There is an essential difference between the 5G network and the 4G network. Therefore, how the NWDAF network element obtains the data in the 4G communication network becomes an urgent problem to be resolved.

This application provides a data obtaining method, so that, through interaction between two different networks, a data analysis network element in a first network obtains data on a second network element in a second network by using a first network element in the first network. For example, the NWDAF network element can obtain the data in the 4G communication network through interaction between the 5G network and the 4G network.

The technical solutions in embodiments of this application may be applied to various communication systems, for example, a long term evolution (LTE) system, an LTE frequency division duplex (FDD) system, an LTE time division duplex (TDD) system, a worldwide interoperability for microwave access (WiMAX) communication system, a 5G system, a new radio (NR) system, a future network, or the like. The technical solutions provided in this application may be further applied to a future communication system, for example, a 6th generation mobile communication system. Alternatively, the communication system may be a public land mobile network (PLMN), a device-to-device (D2D) communication system, a machine-to-machine (M2M) communication system, an internet of things (IoT) communication system, or another communication system.

In embodiments of this application, the user equipment or the access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application provided that a program that records code for the method provided in embodiments of this application can be run to perform communication according to the method provided in embodiments of this application. For example, the method provided in embodiments of this application may be performed by the user equipment, the access network device, or a functional module that is in the user equipment or the access network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

A specific structure of an execution body of a method provided in embodiments of this application is not particularly limited in the following embodiments provided that a program that records code for the method provided in embodiments of this application can be run to perform communication according to the method provided in embodiments of this application. For example, the method provided in embodiments of this application may be performed by a terminal device, a core network device, or a functional module that is in the terminal device or the core network device and that can invoke and execute the program.

For ease of understanding of embodiments of this application, the following descriptions are provided.

First, in this application, “indicate” may be understood as “enable”, and “enable” may include direct enabling and indirect enabling. When a piece of information is described as being used to enable A, the information may directly enable A or indirectly enable A, but it does not necessarily indicate that the information carries A.

Information enabled by the information is referred to as to-be-enabled information. In a specific implementation process, the to-be-enabled information may be enabled in a plurality of manners, for example, but not limited to, the following manners: The to-be-enabled information may be directly enabled, for example, the to-be-enabled information or an index of the to-be-enabled information is enabled. Alternatively, the to-be-enabled information may be indirectly enabled by enabling other information, and there is an association relationship between the other information and the to-be-enabled information. Alternatively, only a part of the to-be-enabled information may be enabled, and the other part of the to-be-enabled information is known or pre-agreed on. For example, specific information may alternatively be enabled by using an arrangement sequence of a plurality of pieces of information that is pre-agreed on (for example, stipulated in a protocol), to reduce enabling overheads to some extent. In addition, a common part of all pieces of information may be further identified and enabled in a unified manner, to reduce enabling overheads caused by separately enabling same information.

Second, “first”, “second”, and various numerical numbers (for example, “#1”, and “#2”) shown in this application are merely for ease of description, and are used to distinguish between objects, but are not intended to limit the scope of embodiments of this application, for example, are used to distinguish between different messages, but are not used to describe a particular order or sequence. It should be understood that the objects described in this way are interchangeable in a proper circumstance, so that a solution other than embodiments of this application can be described.

Third, in this application, “preset” may include “predefined”, for example, defined in protocols. “Predefined” may be implemented by pre-storing corresponding code or a corresponding table in a device (for example, user equipment or a core network device) or in another manner that may be used to indicate related information. A specific implementation of “predefined” is not limited in this application.

Fourth, “store” in embodiments of this application may be storage in one or more memories. The one or more memories may be separately disposed, or may be integrated into an encoder or a decoder, a processor, or a communication apparatus. Alternatively, a part of the one or more memories may be separately disposed, and a part of the one or more memories are integrated into the decoder, the processor, or the communication apparatus. A type of the memory may be a storage medium in any form. This is not limited in this application.

Fifth, “protocols” in embodiments of this application may be standard protocols in the communication field, for example, may include a 5G protocol, a new radio (NR) protocol, and a related protocol applied to a future communication system. This is not limited in this application.

Without loss of generality, the following describes in detail the data obtaining method provided in embodiments of this application by using interaction between network elements as an example.

Figure 3:
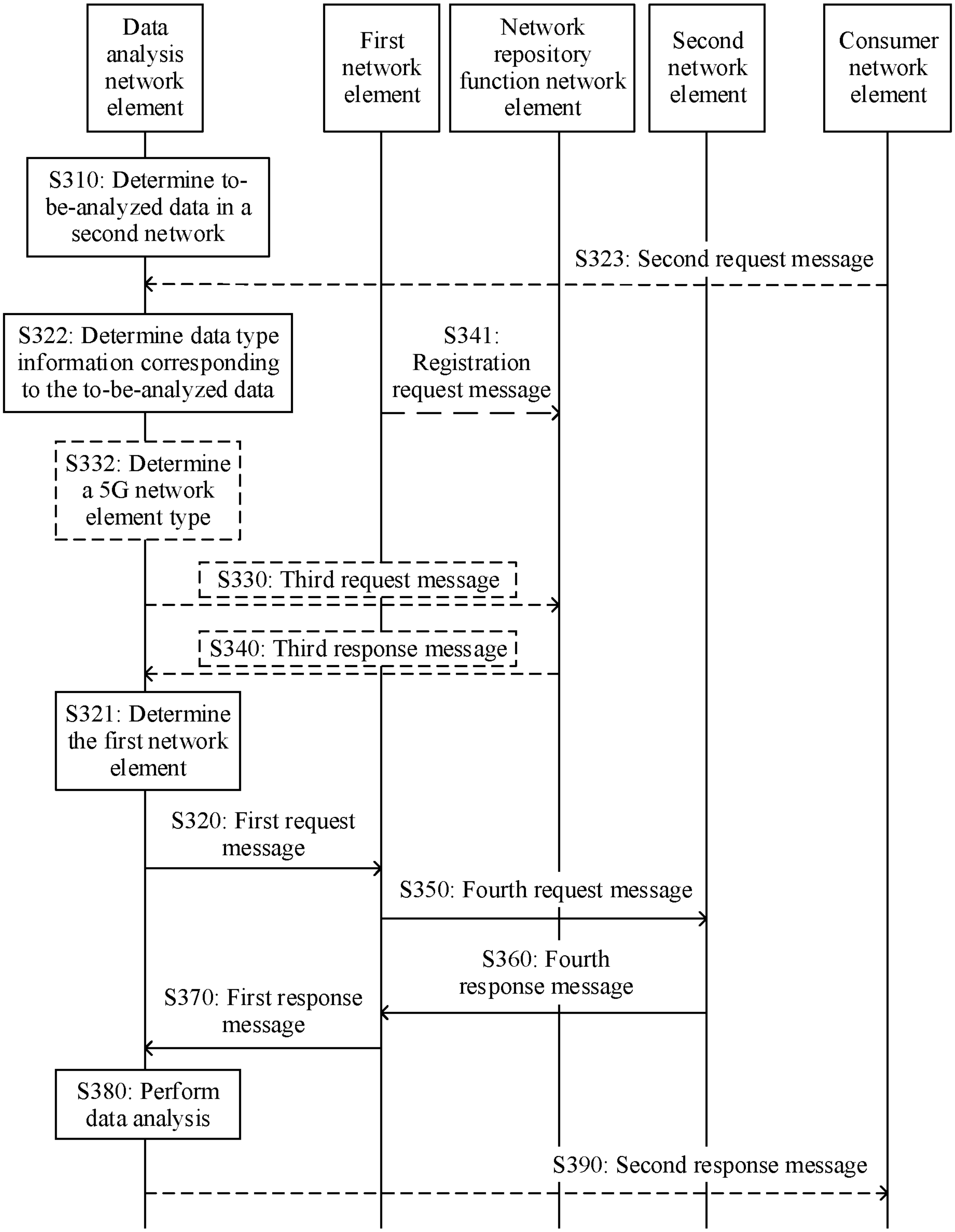
FIG. 3 is a schematic flowchart of a data obtaining method according to an embodiment of this application.

FIG. 3 is a schematic flowchart of a data obtaining method according to an embodiment of this application.

The data obtaining method includes at least some of the following steps.

S310: A data analysis network element determines to-be-analyzed data in a second network.

In this embodiment of this application, the data analysis network element in a first network needs to perform data analysis on the to-be-analyzed data in the second network. In other words, the data analysis network element determines that data that needs to be obtained includes the to-be-analyzed data in the second network.

For example, the first network and the second network are different types of networks. For example, the first network is a 5G network, and the second network is a 4G network. For another example, the first network is a future communication network, and the second network is a 5G network. For ease of understanding, in this embodiment of this application, an example in which the first network is the 5G network and the second network is the 4G network is usually used for description. However, the technical solutions provided in this application are not limited to being applied only to a scenario in which the first network is the 5G network and the second network is the 4G network.

The data analysis network element may be configured to implement a network data analytics function. Specifically, the data analysis network element has a data collection function, a training function, and an inference function. The data collection function may be used to collect related data from a network element of a network, a third-party service server, user equipment, or a network management system. The data training function is used to perform analysis and training based on related training data. The data inference function is used to: perform analysis and inference based on related inference data, and provide a data analysis result to the network element of the network, the third-party service server, the user equipment, or the network management system. The analysis result may assist the network in selecting a quality of service parameter of a service, assist the network in performing traffic routing, or assist the network in selecting a background traffic transfer policy, or the like.

This embodiment of this application mainly relates to the data collection function of the data analysis network element. The data analysis network element may perform related training and inference based on the collected data. Subsequent data inference and training are not described in detail in this application. For details, refer to descriptions in a current related technology.

For example, the data analysis network element in embodiments of this application may be an NWDAF network element, or a network element in another first network architecture that can implement a network data analytics function. A name of the network element is not limited in embodiments of this application.

For ease of description, the following uses an example in which the data analysis network element is an NWDAF for description.

Further, after the NWDAF determines that the data that needs to be obtained includes the to-be-analyzed data in the second network, the NWDAF may obtain the to-be-analyzed data in the second network by using a first network element in the first network. The procedure shown in FIG. 3 further includes the following step.

S320: The NWDAF sends a first request message to a first network element.

The first request message is used to request to obtain the to-be-analyzed data, the first request message includes first indication information, and the first indication information indicates that the to-be-analyzed data belongs to the second network.

In a possible implementation, the first request message may be referred to as a data request message, and the data request message may be that the NWDAF invokes an Namf_EventExposure_subscription service of the first network element.

For example, the first indication information includes at least one of the following information:

data type information of the to-be-analyzed data in the second network, network type information of the second network, network identification information of the second network, area information corresponding to the second network, area information corresponding to the second network, or information about the second network element in the second network, where the second network element is configured to provide the to-be-analyzed data.

When the first indication information is the area information corresponding to the first network, in other words, the NWDAF does not directly specify the area information corresponding to the second network, the first network element may subsequently obtains, through mapping based on the received area information corresponding to the first network, the corresponding area information corresponding to the second network.

For example, a mapping relationship between the area information corresponding to the second network and the area information corresponding to the first network is preconfigured in the first network element. Alternatively, the first network element may query, from a network repository function network element or a network management system, the mapping relationship between the area information corresponding to the second network and the area information corresponding to the first network.

When the first indication information indicates the information about the second network element, the data analysis network element determines, based on a correspondence between obtained historical data in the second network and a network element in the second network, the second network element that can provide the to-be-analyzed data.

For example, the NWDAF may determine, based on historical data reporting information of the second network, a second network element (a network element in the second network), second network data reported by the second network element, and an area corresponding to the second network. That is, the NWDAF may determine, based on a historical record, a data type corresponding to the to-be-analyzed data and the network element that is in the second network and that corresponds to the area corresponding to the second network. In this manner, the NWDAF still sends a data obtaining request to the first network element, but the first request message includes a network element (for example, a 4G MME instance, an SGW instance, or a PGW instance) that is in the second network and that provides the to-be-analyzed data. Subsequently, the first network element does not need to determine a network element that is in the second network and from which the to-be-analyzed data is obtained.

In a possible implementation, the network type information of the second network indicates a type of the second network, and may be the type of the second network or may be related information indicating the type of the second network.

For example, the network type information of the second network may be the 4G network, an LTE network, an evolved universal terrestrial radio access network (E-UTRAN), or the like. The network type information of the second network indicates the first network element to obtain and provide the to-be-analyzed data corresponding to the network type information of the second network.

In a possible implementation, the network identification information of the second network indicates a network identifier of the second network, and may be the network identifier of the second network or may be related information indicating the network identifier of the second network.

For example, the network identification information of the second network may be a 4G public land mobile network identity (PLMN ID).

In a possible implementation, the area information corresponding to the second network in this embodiment of this application may be related information (for example, a 4G AOI) of an area of interest (AOI) of the second network, or may be related information of a tracking area (TA) of the second network or related information of a cell in the second network. A specific form of the area information corresponding to the second network is not limited in this application, and may be information identifying an area in the second network.

Similarly, the area information corresponding to the first network in this embodiment of this application may be related information (for example, a 5G AOI) of an area of interest in the first network, or may be related information of a tracking area in the first network. A specific form of the area information corresponding to the first network is not limited in this application, and may be information identifying an area in the first network.

It should be noted that, that the first indication information indicates that the to-be-analyzed data belongs to the second network may be a direct indication. For example, the first indication information includes the network type information of the second network, the network identification information of the second network, or the area information corresponding to the second network.

Alternatively, that the first indication information indicates that the to-be-analyzed data belongs to the second network may be an indirect indication. For example, the first indication information includes the data type information of the to-be-analyzed data in the second network.

In addition, when the first indication information is the data type information of the to-be-analyzed data in the second network, it may be understood that data type information of a data type in the first network is different from data type information of the data type in the second network. For example, the data type is location information, the location information is identified by location information #1 in the first network, and is identified by location information #2 in the second network. Therefore, when the data type of the to-be-analyzed data is location information, the first indication information may be the location information #2, and the first indication information may indicate that the to-be-analyzed data belongs to the second network and the data type of the to-be-analyzed data is the location information.

It should be further noted that, when the foregoing first indication information is the area information corresponding to the second network, the first indication information not only indicates that the to-be-analyzed data belongs to the second network, but also indicates that the to-be-analyzed data belongs to a network element in an area indicated by the area information in the second network. In other words, in some cases, the first indication information may also be understood as filter information. In this embodiment of this application, that the to-be-analyzed data belongs to the second network means that the to-be-analyzed data is obtained from the second network.

In a possible implementation, the first request message further includes information about a time period (for example, indicating a time period), indicating the first network element to obtain and provide to-be-analyzed data corresponding to the time period.

Before the NWDAF sends the first request message to the first network element, the method procedure shown in FIG. 3 further includes the following step.

S321: The NWDAF determines the first network element.

The first network element is configured to obtain the to-be-analyzed data from the second network.

Specifically, the NWDAF determines the first network element in the following several manners:

Manner 1

The NWDAF pre-configures which first network elements in the first network can obtain the to-be-analyzed data from the second network.

For example, the NWDAF pre-configures a 5G network element instance (an AMF instance, an SMF instance, or the like) to provide 4G network data.

Manner 2

The NWDAF determines data type information corresponding to the to-be-analyzed data, and the data analysis network element determines the first network element based on the data type information. The data type information corresponding to the to-be-analyzed data may indicate the data type corresponding to the to-be-analyzed data, and may be the data type corresponding to the to-be-analyzed data or may be other information indicating the data type corresponding to the to-be-analyzed data.

In Manner 2, the NWDAF needs to determine the data type corresponding to the to-be-analyzed data. The method procedure shown in FIG. 3 further includes the following step.

S322: The NWDAF determines the data type information corresponding to the to-be-analyzed data.

The data type information indicates a category or an identifier of the to-be-analyzed data. For example, the data type information indicates that the to-be-analyzed data may be mobility-related data, session-related data, policy and charging-related data, quality of service-related data, or the like.

In a possible implementation, the to-be-analyzed data may also be referred to as first data, and the data type information may also be referred to as first type information. A specific name of a noun is not limited in this embodiment of this application.

It should be noted that a data type indicated by the data type information is not limited in this application. Refer to a data type included in a data analysis task that can be currently performed by the NWDAF. A specific data analysis task that can be performed by the NWDAF is not described in detail in this application. Refer to descriptions of the current related technology.

For example, currently, the NWDAF can perform mobility-related data analysis. In other words, the data type includes a mobility-related category, for example, location information of a user.

In addition, the to-be-analyzed data in this embodiment of this application includes related data of the user equipment in the second network (that is, the second network data includes data at a user equipment granularity) or related data (namely, data at a network device granularity) of the second network. The data at the user equipment granularity may be data related to a moving track of the user equipment in the second network or other data of the user equipment in the second network. This is not limited in this application. The data at the network device granularity may be data such as network quality. Details are not described one by one herein.

Specifically, that the NWDAF determines the data type information corresponding to the to-be-analyzed data includes:

The NWDAF determines, based on identification information, the data type information corresponding to the to-be-analyzed data, and the identification information indicates a type of a data analysis task performed by the data analysis network element.

In a possible implementation, the identification information may be referred to as an analytic identifier (analytic ID), and the analytic ID indicates a type of data analysis performed by the NWDAF, or indicates an analysis task performed by the NWDAF. It may be understood that different data analysis tasks are distinguished based on different analytic IDs. The NWDAF may learn of, based on the analysis task indicated by the identification information, the data type of the to-be-analyzed data that needs to be obtained.

The data type may be represented by a data type or an event identifier (event ID).

For example, the event ID may be a user equipment location (UE location), UE access information, a service type identifier (application ID), information related to a quality of service flow (QoS flow), service experience, or the like.

The UE access information may include an access type (for example, a 5G radio access technology (RAT), a 4G RAT, or a wireless local area network (wireless fidelity, Wi-Fi)) and/or an access frequency (for example, 800 MHz, 1800 MHz, 2.6 GHz, or 3.5 GHz), traffic information corresponding to the RAT or the access frequency, congestion information corresponding to the RAT or the access frequency, and QoS retainability information corresponding to the RAT or the access frequency. The information related to the QoS flow may include a flow bit rate, a packet loss rate, a delay, or the like. The service experience may include a service management operating system (service management operating system, service MoS), or the like.

In this embodiment of this application, that the NWDAF determines that the identification information includes the following two possibilities:

Possibility 1

The NWDAF receives a second request message sent by a consumer network element, the second request message is used to request the NWDAF to perform data analysis, and the second request message includes the identification information. In Possibility 1, the method procedure shown in FIG. 3 further includes the following step.

S323: The NWDAF receives the second request message from the consumer network element, or the consumer network element sends the second request message to the NWDAF.

For example, the second request message may be referred to as a data analysis result request message. The second request message is used to request the NWDAF to perform a data analysis task corresponding to the identification information. The NWDAF may determine, based on the identification information included in the second request message, the data type of the to-be-analyzed data that needs to be obtained.

It should be noted that the consumer network element in this embodiment of this application may be any network element that can request the NWDAF to perform data analysis, and may be understood as a network element that uses an NWDAF service. For example, the consumer network element may be an AMF, a UPF, an SMF, or the like. In this embodiment of this application, the consumer network element may be referred to as a 5G consumer network function (5G consumer NF).

In another possible implementation, the identification information may not be included in the second request message to be sent to the NWDAF. The identification information may be sent to the NWDAF by using another message. For example, before, after, or when sending the second request message, the consumer network element sends the identification information to the NWDAF by using signaling exchanged between the consumer network element and the NWDAF.

For ease of description, an example in which the identification information is carried in the second request message is used for description in this embodiment of this application.

In a possible implementation, the second request message further includes second indication information, and the second indication information indicates at least one of the following:

the area information corresponding to the second network, the network type information of the second network, or the network identification information of the second network.

For example, the area information corresponding to the second network may indicate an AOI of the second network. It indicates that the consumer network element requires the NWDAF to obtain, for the identification information, an analysis result of an area in the second network. In this implementation, the second indication information may be referred to as area filter information, to indicate an area for which the data analysis task corresponding to the identification information is performed.

In a possible implementation, the AOI of the second network may be a tracking area (TA) of the second network or a cell list of the second network.

Specifically, the NWDAF may determine, based on the AOI of the second network indicated by the second indication information in the second request message, that to-be-obtained data includes the to-be-analyzed data in the second network.

For example, the network type information of the second network indicates a network type to which the second network belongs, for example, a 4G network type. It indicates that the user equipment requires the NWDAF to obtain, for the identification information, the to-be-analyzed data in the second network.

For example, the network identification information of the second network indicates a network identifier of the second network, and may be the network identifier of the second network or may be related information indicating the network identifier of the second network.

For example, the network identification information of the second network may be a 4G PLMN ID.

Specifically, the NWDAF may determine, based on a second network type indicated by the second indication information in the second request message, that the to-be-analyzed data that needs to be obtained includes the to-be-analyzed data in the second network.

It should be noted that the second indication information may be understood as filter information, and may further indicate a first time period. It indicates that the to-be-analyzed data is obtained within a specific time period. That is, the second indication information may be referred to as time filter information, to indicate a time period in which the data analysis task corresponding to the identification information is performed.

In addition, it should be noted that, when being understood as analytic filter information, the second indication information in this embodiment of this application may indicate to obtain the to-be-analyzed data from the AOI of the first network and/or the AOI of the second network, or may indicate to obtain the to-be-analyzed data from the first network and/or the second network. Determining, based on the second indication information, that obtained to-be-analyzed data is data in the second network is only a derivative function of the second indication information.

The NWDAF may alternatively determine, based on a local pre-configuration, that the second network data needs to be analyzed. For example, the second request message received by the NWDAF includes the identification information, and the NWDAF needs to obtain the second network data when locally configured to perform data type analysis indicated by the identification information.

In a possible implementation, the NWDAF locally stores a correspondence between the identification information and the 4G network data.

Possibility 2

If the NWDAF does not receive a second request message sent by a consumer network element, the NWDAF determines the identification information based on a pre-configured task, and the pre-configured task indicates a data analysis type corresponding to the identification information.

The data analysis type may also be understood as a data analysis task, and the data analysis task corresponds to an identifier.

For example, the pre-configured task in the Possibility 2 may be, predefined in a protocol, that the NWDAF performs data analysis for the data analysis task indicated by the identification information.

In Possibility 2, the NWDAF determines the identification information based on the pre-configured task, and the pre-configured task indicates that the NWDAF needs to obtain the data in the second network when performing data analysis based on the identification information.

For example, the NWDAF locally stores correspondences between the data that needs to be obtained and different analysis types. When the NWDAF needs to analyze the data type indicated by the identification information, the NWDAF may determine, based on the correspondence, that the data in the second network needs to be obtained.

Manner 3

The NWDAF determines network element type information of the first network element, and the NWDAF determines the first network element based on the network element type information of the first network element.

In a possible implementation, in this embodiment of this application, the NWDAF determines, based on the data type of the to-be-analyzed data, a network element type of the first network element. That the NWDAF determines, based on the identification information, the data type information corresponding to the to-be-analyzed data is described above. Details are not described herein again.

Specifically, the NWDAF is configured with a correspondence between the data type and the network element type, and the NWDAF may determine the network element type based on the correspondence and the determined data type.

That the NWDAF determines the first network element based on the network element type information includes: The NWDAF determines that the first network element belongs to a network element type corresponding to the network element type information and that the first network element meets a preset condition. The network element type is determined based on the network element type information.

Manner 4

The NWDAF determines the first network element based on a preset condition, and the first network element meets the preset condition.

The preset condition in this embodiment of this application includes at least one of the following: having an interaction interface with the network element in the second network, being co-located with the network element in the second network, and the area information corresponding to the second network.

The preset condition further includes the area information corresponding to the first network.

Specifically, when the preset condition is the area information corresponding to the first network, the NWDAF determines, based on a preset area mapping relationship and the area information corresponding to the second network, the area information corresponding to the first network. The preset area mapping relationship indicates the area information that corresponds to the second network and that is associated with the area information corresponding to the first network.

For example, when the preset condition is a 5G TA, the NWDAF determines the preset condition (5G TA) based on a 4G TA and a preset mapping relationship between the 5G TA and the 4G TA. For example, when the preset condition is a 5G AOI, the NWDAF determines the preset condition (5G AOI) based on a 4G AOI and a preset mapping relationship between the 5G AOI and the 4G AOI.

The following uses an example to describe how the NWDAF determines the first network element based on the network element type information of the first network element and the preset condition.

For example, when the network element type includes a mobility management network element type, and an AMF #1, an AMF #2, and an AMF #3 in all mobility management network elements in the first network have interaction interfaces with the network element in the second network, the first network element includes the AMF #1, the AMF #2, and the AMF #3.

For another example, when the network element type includes a session management network element type, and an SMF #1, an SMF #2, and an SMF #3 in all session management network elements in the first network are respectively co-located with a PGW-C #1, a PGW-C #2, and a PGW-C #3 in the second network, the first network element includes the SMF #1, the SMF #2, and the SMF #3.

For another example, when the network element type includes a mobility management network element type, and an AMF #1, an AMF #2, and an AMF #3 in all mobility management network elements in the first network are located in a corresponding area in the second network, the first network element includes the AMF #1, the AMF #2, and the AMF #3.

For another example, when the network element type includes a session management network element type, and an SMF #1, an SMF #2, and an SMF #3 in all session management network elements in the first network are located in a corresponding area in the second network, the first network element includes the SMF #1, the SMF #2, and the SMF #3.

For another example, when the network element type includes a mobility management network element type, and an AMF #1, an AMF #2, and an AMF #3 in all mobility management network elements in the first network work within a preset time period, the first network element includes the AMF #1, the AMF #2, and the AMF #3.

For another example, when the network element type includes a session management network element type, and an SMF #1, an SMF #2, and an SMF #3 in all session management network elements in the first network work within a preset time period, the first network element includes the SMF #1, the SMF #2, and the SMF #3.

When the NWDAF determines the first network element based on the preset condition, the network element type may not need to be considered.

For example, if the preset condition is that there is the interaction interface with the network element in the second network, and the AMF #1, the AMF #2, and the AMF #3 in the first network have interaction interfaces with the network element in the second network, the first network element includes the AMF #1, the AMF #2, and the AMF #3.

It should be noted that the foregoing preset condition may alternatively be in another possible form, and is used to select, from at least one network element belonging to the network element type, at least one network element that meets the preset condition. For example, the preset condition may alternatively be a network element outside an area, a network element that does not work within a time period, or the like. Examples are not described one by one herein.

That the NWDAF determines the first network element based on the network element type further includes: The NWDAF determines that the first network element includes all network elements belonging to the network element type.

The network element type information may indicate the network element type, and may be the network element type or may be other information indicating the network element type.

It should be noted that, in this embodiment of this application, the network element type of the first network element may include a plurality of network elements. For ease of distinguishing, a specific network element may be referred to as a network element instance (instance), and a network element type of the plurality of network elements is referred to as the network element type.

For example, if the data type includes mobility-related information of the UE (for example, location information, access type information, or access frequency information of the UE) in the second network, the NWDAF determines, based on a configuration, that the network element type corresponding to the data type includes the mobility management network element type. The mobility management network element type includes at least one mobility management network element instance. The NWDAF may send a request to a 5G AMF to obtain the mobility-related information of the UE in the 4G network.

For another example, if the data type includes packet data network (packet data network, PDN) session-related information of the UE in the 4G network, the NWDAF determines, based on a configuration, that the network element type corresponding to the data type includes the session management network element type. The session management network element type includes at least one session management network element instance. The NWDAF may send a request to a 5G SMF to obtain the session-related information of the UE in the 4G network.

Specifically, the NWDAF determines the first network element based on the network element type of the first network element in the following several manners:

In a possible implementation, the NWDAF locally stores information about the first network element, and the NWDAF may determine the first network element from the at least one network element belonging to the network element type.

In another possible implementation, the NWDAF does not locally store information about a 5G network element, and the NWDAF needs to obtain information about the first network element from the network repository function network element. In this implementation, the method procedure shown in FIG. 3 further includes the following steps.

S330: The NWDAF sends a third request message to the network repository function network element.

The third request message is used to request the network repository function network element to provide the information about the first network element.

In a possible implementation, the third request message includes the foregoing preset condition, to indicate that the first network element meets the preset condition.

In another possible implementation, the third request message includes the foregoing network type information, to indicate that the first network element belongs to the network element type corresponding to the network element type information.

In still another possible implementation, the third request message includes the network type information and the preset condition, to indicate that the first network element belongs to the network element type corresponding to the network element type information and that the first network element meets the preset condition.

S340: The network repository function network element sends a third response message to the NWDAF.

The third response message includes the information about the first network element.

For example, when a specific area corresponding to the second network is limited, to be specific, the NWDAF needs to obtain the data in the second network in the area corresponding to the second network, the NWDAF may further determine the first network element based on the area corresponding to the second network. Specifically, it is included:

The third request message sent by the NWDAF to the network repository function network element includes the foregoing network element type (for example, the AMF type or the SMF type) and the area information corresponding to the second network.

For example, the NWDAF requests an AMF or an SMF corresponding to the area corresponding to the second network. The second request message is used to request the network repository function network element to discover the AMF corresponding to the area corresponding to the second network, or the second request message is used to request the NRF to discover the SMF corresponding to the area corresponding to the second network.

The network repository function network element may discover, based on the network element type and the area information corresponding to the second network that are carried in the third request message, a network element corresponding to the area corresponding to the second network. It should be noted that the first network element (for example, the AMF or the SMF) initiates a network element registration procedure to the network repository function network element. The method procedure shown in FIG. 3 further includes the following steps.

S341: The first network element sends a registration request message to the network repository function network element.

The registration request message is used to register attribute information of the first network element with the NRF. The attribute information of the first network element may be a network element function profile (NF profile), and the NF profile includes a first network serving area served by the first network element.

In addition, in the network element registration procedure, the first network element needs to register a second network servicing area corresponding to the first network serving area of the first network element with the NRF.

There is a mapping relationship between area division in the first network and area division in the second network. For example, a first tracking area list #1 (TA list #1) corresponds to a second tracking area list #2 (TA list #2), and the mapping relationship may exist on the AMF or the SMF, the AMF or the SMF may learn of, based on the mapping relationship, the second network (for example, the 4G TA) corresponding to the first network serving area (for example, the 5G TA).

After receiving the third request message, the network repository function network element determines the first network element, and sends the third response message to the NWDAF. The third response message includes the information that is about the first network element and that corresponds to the determined area corresponding to the second network.

In a possible implementation, the third response message may be referred to as a network element discovery response message.

When the third request message is a network element discovery request message, and the third response message is a network element discovery response message, a current network element discovery procedure may be reused. A difference is that the third request message sent by the NWDAF to the network repository function network element carries the area information corresponding to the second network, instead of an area information corresponding to the first network. In addition, in this embodiment of this application, when registering with the network repository function network element, a network element in the first network registers attribute information of the network element and a second network serving area corresponding to a first network serving area of the network element with the network repository function network element.

The NWDAF may also learn of, based on statistical information or configuration information of the NWDAF, a correspondence between an area corresponding to the second network and an area corresponding to the first network, and the NWDAF obtains, through mapping based on the area corresponding to the second network, the area corresponding to the first network. A current network element discovery procedure may be reused. The NRF is queried based on the area corresponding to the first network, to obtain a network element that is in the first network and that corresponds to the area corresponding to the second network. In other words, the second request message carries the area information corresponding to the first network.

It should be noted that, when the area corresponding to the second network is not considered or there is no limitation on the area corresponding to the second network, the NWDAF may also request the to-be-analyzed data from all first network elements corresponding to the network element type.

Further, a requirement for having an interaction interface with the second network may alternatively be considered. For example, the NWDAF determines, in the network element type, an AMF that has an interaction interface with the second network, or determines an SMF co-located with a packet data network gateway.

For example, the first network element includes an access and mobility management function AMF network element, and the second network element includes a mobility management entity MME network element that has an interaction interface with the AMF network element.

Alternatively, the first network element includes a session management function SMF network element, and the second network element includes a packet data network gateway network element co-located with the SMF network element.

For example, the interaction interface between the AMF and the MME includes an N26 interface, and the packet data network gateway network element co-located with the SMF includes a packet data network gateway control plane (PGW-C) network element.

Specifically, the preset condition that may be sent by the NWDAF to the NRF includes an AMF that has an interaction interface with the 4G network, or the preset condition that may be sent by the NWDAF to the NRF includes the SMF co-located with the packet data network gateway. In other words, the registration request message sent by the first network element to the NRF includes at least one of the following information:

the area information corresponding to the second network, the area information corresponding to the first network, information about an interaction interface between the first network element and the second network element, or information about the second network element co-located with the first network element.

Specifically, after receiving the first request message, the first network element sends a fourth request message to the second network element, to request the second network element to provide the to-be-analyzed data. The method procedure shown in FIG. 3 further includes the following step.

S350: The first network element sends the fourth request message to the second network element.

The second network element includes a network element having an interaction interface with the first network element, and/or a network element co-located with the first network element in the second network.

The fourth request message is used to obtain the to-be-analyzed data, and the fourth request message includes the data type of the to-be-analyzed data.

In a possible implementation, the fourth request message may be referred to as a data obtaining request message.

In a possible implementation, the fourth request message further includes at least one of the network type information of the second network, the area information corresponding to the second network, or the time filter information. The network type information of the second network indicates that the to-be-analyzed data meets a network type of the second network, the area information corresponding to the second network indicates that the to-be-analyzed data is associated with an area, and the time filter information indicates that the to-be-analyzed data is for a time period.

Specifically, before sending the fourth request message to the second network element, the first network element needs to determine a network element or network elements in the second network that are specifically the second network element. There are the following two possibilities:

Possibility 1

The first request message received by the first network element carries the information about the second network element. In other words, the first network element may learn of the second network element based on the first request message.

In Possibility 1, before sending the first request message to the first network element, the NWDAF needs to determine the information about the second network element.

Possibility 2

The first network element determines that the second network element is a network element meeting a preset condition in the second network.

The preset condition includes at least one of the following:

a network element having an interaction interface with the first network element, a network element co-located with the first network element, a network element associated with the area corresponding to the second network, or a network element working within a preset time period, where the area corresponding to the second network includes the AOI of the second network.

When the preset condition is the area corresponding to the second network, and the first request message includes the area corresponding to the first network, the first network element determines, based on the preset area mapping relationship, the area that corresponds to the second network and that corresponds to the area corresponding to the first network, and determines that the second network element includes the network element associated with the area corresponding to the second network.

An example in which the first network element belongs to the AMF type is used for description.

When no area filter information (the area information corresponding to the second network or the area information corresponding to the first network) is included in the first request message, the AMF may determine, as objects for obtaining the to-be-analyzed data, all MME instances that each have an N26 interface with the AMF.

When the first request message includes the area information corresponding to the second network, the AMF further determines an MME instance corresponding to the area corresponding to the second network.

When the first request message includes the area information corresponding to the first network, the AMF first obtains, through mapping based on the area corresponding to the first network, the area corresponding to the second network, and then determines a corresponding MME instance based on the area corresponding to the second network.

Further, the method procedure shown in FIG. 3 further includes the following step.

S360: The first network element receives a fourth response message from the second network element, or the second network element sends the fourth response message to the first network element.

The fourth response message includes the to-be-analyzed data.

For how the second network element obtains the 4G network data, refer to related regulations in a current protocol. The obtained to-be-analyzed data is not limited to data generated by the second network element. The second network element may obtain data of another network element (such as a 4G access network device, an SGW, a PGW, a PCF, or a UDM), the user equipment or the like through a corresponding interface. The to-be-analyzed data obtained by the second network element is not limited to mobility-related data. The second network element may also obtain related data such as session-related data (for example, PDN session information obtained from the PGW) or policy-related data (a PCC rule obtained from a PCRF).

Further, the method procedure shown in FIG. 3 further includes the following step.

S370: The NWDAF receives a first response message from the first network element, or the first network element sends the first response message to the NWDAF.

The first response message includes the to-be-analyzed data.

Specifically, the first network element may invoke an Namf_EventExposure_Notify service to feed back the obtained to-be-analyzed data to the NWDAF.

Specifically, the NWDAF performs a corresponding data analysis task based on the obtained 4G network data, to obtain a data analysis result. In a possible implementation, the NWDAF feeds back the data analysis result to the consumer network element. The method procedure shown in FIG. 3 further includes the following steps:

S380: The NWDAF performs data analysis.

S390: The NWDAF sends a second response message to the consumer network element. The second response message includes the data analysis result.

How the NWDAF performs data analysis is not limited in this embodiment of this application. Refer to descriptions of the current related technology.

In this embodiment of this application, through the interaction interface between the first network element in the first network and the second network element in the second network, or through co-location of the first network element in the first network and the second network element in the second network, the NWDAF, as a network element in the first network, can successfully collect related data in the second network. This helps the NWDAF perform data analysis on related service behavior in the second network and obtain a corresponding data analysis result.

Figure 4:
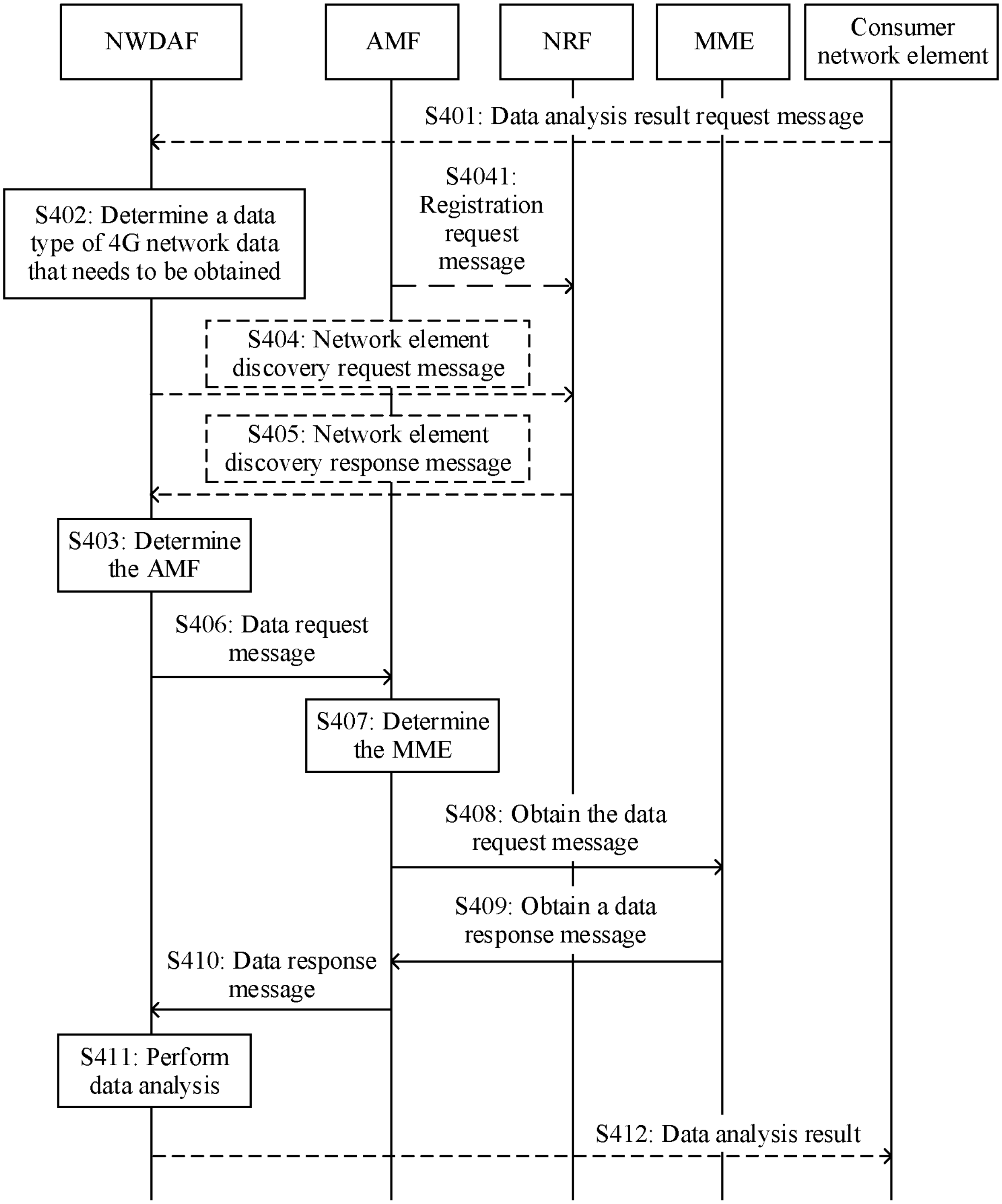
FIG. 4 is a schematic flowchart of another data obtaining method according to an embodiment of this application.

For ease of understanding, the following describes, with reference to FIG. 4, the data obtaining method provided in this application by using an example in which a first network element is an AMF network element in a 5G network (or referred to as a 5G AMF instance) and a second network element is an MME network element in a 4G network (or referred to as a 4G MME instance).

FIG. 4 is a schematic flowchart of another data obtaining method according to an embodiment of this application.

The data obtaining method includes at least some of the following steps.

S401: An NWDAF receives a data analysis result request message from a consumer network element (consumer), or the consumer network element sends the data analysis result request message to the NWDAF.

For example, the data analysis result request message may be that the consumer network element invokes an Nnwdaf_analyticsSubscription service or an Nnwdaf_AnalyticsInfo_Request service of the NWDAF.

The data analysis result request message is used to request the NWDAF to perform a data analysis task corresponding to an analytic ID.

The analytic ID included in the data analysis result request message indicates a data analysis type, or the analytic ID indicates an analysis task to be performed by the NWDAF. The NWDAF may learn of, based on the analysis task specified by the analytic ID, a data type (a data type or an event ID) that needs to be obtained.

In a possible implementation, the data analysis result request message includes analytic filter information.

For example, the analytic filter information includes area filter information, time filter information, and the like. The area filter information indicates an area for which the data analysis task corresponding to the analytic ID is performed, and the time filter information indicates a time period for which the data analysis task corresponding to the analytic ID is performed.

The area filter information may include a 5G network area (5G AOI) and/or a 4G network area (4G AOI). If the data analysis result request message includes the 4G network area, it indicates that the consumer requires the NWDAF to obtain, for the analytic ID, a data analysis result of an area in the 4G network.

In a possible implementation, the data analysis result request message includes network type information RAT (for example, the RAT is the 5G network and/or the 4G network). If the data analysis result request message includes 4G network type information, it indicates that the consumer requires the NWDAF to obtain, for the analytic ID, a data analysis result of an area in the 4G network. The network type information may also be understood as the analytic filter information, or the network type information does not belong to the analytic filter information.

S402: The NWDAF determines a data type of 4G network data that needs to be obtained.

In a possible implementation, the NWDAF may determine, based on the data analysis result request message in S401, the data type of the 4G network data that needs to be obtained. Specifically, there are the following several manners.

Manner 1: The NWDAF determines, based on the 4G AOI in the analytic filter information of the data analysis result request message, the 4G network data that needs to be obtained. Then, the NWDAF determines, based on the analytic ID, the data type of the 4G network data that needs to be obtained (the NWDAF stores a correspondence between the analytic ID and a type of to-be-obtained data).

Manner 2: The NWDAF determines, based on the 4G network type information in the analytic filter information of the data analysis result request message, the 4G network data that needs to be obtained. Then, the NWDAF determines, based on the analytic ID, the data type of the 4G network data that needs to be obtained.

Manner 3: If the data analysis result request message does not include the 4G AOI or 4G network type information, the NWDAF may also determine, based on a pre-configured task, that the 4G network data needs to be analyzed for the analytic ID, so as to determine, based on the analytic ID, the data type of the 4G network data that needs to be obtained.

In another possible implementation, the NWDAF may perform data analysis in advance on the premise that the data analysis request message from the consumer is not received. If S401 is not performed, for an analytic ID, the NWDAF may determine, based on a pre-configured task, the type of the 4G network data that needs to be obtained, and perform analysis by using the 4G network data as input data, so as to obtain a data analysis result corresponding to the analytic ID.

S403: The NWDAF determines an AMF.

The NWDAF determines, based on the data type of the to-be-obtained 4G network data, a network element instance that obtains the 4G network data.

In a possible implementation, the object network element instance may be a 5G network element instance (for example, a 5G AMF instance or a 5G SMF instance).

Specifically, the NWDAF may determine, based on an internal configuration, a 5G network element type corresponding to the data type of the 4G network data.

For example, if the NWDAF needs to obtain mobility-related information (such as a location, an access type, or an access frequency of UE) of the UE in the 4G network, the NWDAF determines, based on a configuration, that the corresponding 5G network element type is an AMF type. In other words, the NWDAF subsequently sends a request to a 5G AMF to obtain the mobility-related information of the UE in the 4G network.

For another example, if the NWDAF needs to obtain PDN session-related information of UE in the 4G network, the NWDAF determines, based on a configuration, that the corresponding 5G network element type is an SMF type.

Further, if a specific 4G AOI is limited, to be specific, the NWDAF needs to obtain corresponding 4G network data in the 4G AOI, the NWDAF may further determine, based on the 4G AOI, a network element instance corresponding to the 5G network element type.

For example, the NWDAF may obtain, from an NRF, the network element instance corresponding to the 5G network element type. The method procedure shown in FIG. 4 further includes the following steps.

S404: The NWDAF sends a network element discovery request message to the NRF.

For example, the network element discovery request message may be that the NWDAF invokes an Nnrf_NFDiscovery_request service of the NRF.

The network element discovery request message includes the 5G network element type (for example, the NF type is the AMF type or the SMF type) determined in S403 and the 4G AOI.

The 4G AOI may be a 4G TA, 4G TAs or a 4G cell list. It should be noted that the network element discovery request message carries the 4G AOI (rather than the 5G AOI), and is used to request the NRF to discover a 5G network element instance corresponding to the 4G AOI.

For example, the network element discovery request message is used to request the NRF to discover an AMF instance or an SMF instance corresponding to the 4G AOI. The AMF instance or the SMF instance requires a network element that has an interaction interface with or is co-located with a network element in the 4G network, so as to obtain the 4G network data. It may also be understood that the network element discovery request message is specifically used to request the NRF to discover the AMF instance that corresponds to the 4G AOI and that has an N26 interface with an MME in the 4G network, or request the NRF to discover the SMF instance that corresponds to the 4G AOI and is co-located with a PGW-C in the 4G network.

It should be noted that in this implementation, the 5G network element instance (5G AMF instance or SMF instance) initiates a network element registration procedure to the NRF. The method procedure shown in FIG. 4 further includes the following step.

S4041: The AMF sends a registration request message to the NRF.

For example, the registration request message may be that the AMF invokes an Nnrf_NFManagement_NFRegister service.

The registration request message is used to register attribute information of the AMF (an NF profile, including a 5G serving area served by the AMF) with the NRF. In this registration procedure, the AMF registers, with the NRF, a 4G serving area corresponding to the 5G serving area of the AMF.

S405: The NRF sends a network element discovery response message to the NWDAF.

For example, the network element discovery response message may be that the NRF invokes an Nnrf_NFDiscovery_response service of the NWDAF.

The network element discovery response message includes the 5G network element instance that corresponds to the 4G AOI and that is determined by the NRF.

For example, the network element discovery response message includes an AMF instance ID and/or an AMF instance address that correspond/corresponds to the 4G AOI.

For another example, the network element discovery response message includes an SMF instance ID and/or an SMF instance address that correspond/corresponds to the 4G AOI.

In addition to the method for obtaining, by using the NRF, the 5G network element instance corresponding to the 4G AOI in S404 and S405, the NWDAF may also learn of a correspondence between the 4G AOI and the 5G AOI based on statistical information or configuration information of the NWDAF, and the NWDAF obtains the 5G AOI through mapping based on the 4G AOI, and then reuses a current network element discovery procedure to query, based on the 5G AOI from the NRF, the 5G network element instance corresponding to the 5G AOI.

It should be noted that the foregoing solution of determining the 5G network element type based on the 4G AOI is an optional solution. When the 4G AOI is not considered or there is no limitation on the 4G AOI, the NWDAF may also request the 4G network data from all network element instances corresponding to the 5G network element type. Alternatively, a requirement for having an interaction interface with the 4G network may be considered. To be specific, the NWDAF determines, in the 5G network element type, an AMF instance that has an N26 interface with the 4G network, or determines an SMF instance co-located with the PGW-C. That is, the NWDAF may query the NRF to determine the AMF instance that has the N26 interface with the 4G network, or the NWDAF may query the NRF to determine the SMF instance co-located with the PGW-C.

In another possible implementation, the NWDAF may further determine a 4G network element instance (for example, a 4G MME instance, an SGW instance, or a PGW instance). In this implementation, the NWDAF may determine, based on historical data reporting information of the 4G network, a 4G network element instance, 4G network data reported by the 4G network element instance, and a 4G AOI corresponding to the 4G network element instance. Based on the historical record, the NWDAF may also determine a 4G data type and the 4G network element instance corresponding to the 4G AOI. In this implementation, the NWDAF still sends a 4G data obtaining request message to the AMF or the SMF, but the data obtaining request message includes information about a 4G network element instance (for example, a 4G MME instance, an SGW instance, or a PGW instance) from which data is to be obtained, and then the AMF or SMF determines a 4G network element instance from which the data is to be obtained.

S406: The NWDAF sends a data request message to the AMF.

The sent data request message is used to request the 4G network data.

For example, the data request message may be that the NWDAF invokes an Namf_EventExposure_subscription service of the AMF.

Specifically, the data request message includes the data type of the to-be-obtained 4G network data, for example, event ID=UE location in 4G or a UE AN type.

In a possible implementation, the data request message includes 4G network access type information (for example, an E-UTRAN, an LTE network, and the 4G network), and the information indicates the AMF to obtain and provide 4G data corresponding to the event ID.

In another possible implementation, the data request message further includes data obtaining filter information, which is used to specify a data obtaining area, data obtaining time, or the like.

For example, the filter information may include the 4G AOI, to indicate the AMF to obtain data that is in the 4G AOI and that corresponds to the event ID.

For another example, the filter information may further include the 5G AOI and the 4G network access type information (for example, the E-UTRAN, LTE, and 4G). In other words, the NWDAF does not directly specify the 4G AOI, but specifies, based on the 4G access type information, that the AMF provides the 4G data corresponding to the event ID, and then the AMF obtains the corresponding 4G AOI through mapping based on the 5G AOI.

In still another possible implementation, the data request message further includes information about the 4G network element instance (for example, the 4G MME instance, the SGW instance, or the PGW instance).

For example, the data request message includes an MME ID or an MME address.

S407: The AMF determines an MME.

The AMF determines an MME network element instance of the to-be-obtained 4G data.

In a possible implementation, when the data request message does not include the area filter information (the 4G AOI or the 5G AOI), the AMF may determine, as the object for obtaining the 4G data, all MMEs that each have an N26 interface with the AMF.

In another possible implementation, when the data request message includes 4G AOI filter information, the AMF further determines an MME corresponding to the 4G AOI.

In still another possible implementation, when the data request message includes the 5G AOI, the AMF first obtains the 4G AOI through mapping based on the 5G AOI, and then determines a corresponding MME based on the 4G AOI.

In yet another possible implementation, when the data request message includes information about the 4G network element instance of the to-be-obtained data, the AMF may determine an MME based on the data request message.

S408: The AMF sends a data obtaining request message to the MME.

The data obtaining request message is used to request to obtain specific 4G network data.

For example, the data obtaining request message may be an N26 interface message.

The data obtaining request message may be specifically sent to the MME instance through the N26 interface.

The data obtaining request message includes the data type of to-be-obtained 4G network data, for example, event ID=UE location in 4G or an access network type (AN type) of the UE.

In a possible implementation, the data obtaining request message further includes the data obtaining filter information, which is used to specify the data obtaining area, the data obtaining time, or the like. For example, the filter information may include the 4G AOI, to indicate the MME to obtain the data that is in the 4G AOI and that corresponds to the event ID.

S409: The MME sends a data obtaining response message to the AMF.

The MME obtains corresponding data in the 4G network based on the data obtaining request message, and feeds back the data to the AMF by using the data obtaining response message.

For example, the data obtaining request message may be an N26 interface response message.

For how the MME obtains the 4G network data, refer to descriptions in a current related technology. This is not limited in this application.

The 4G network data obtained by the MME is not limited to data generated by the MME. The MME may obtain data of another network element (for example, a base station, an SGW, a PGW, a PCF, or a UDM), the UE, or the like through a corresponding interface. The 4G network data obtained by the MME is not limited to mobility-related data. The MME may also obtain related data such as session-related data (for example, PDN session information obtained from the PGW) or policy-related data (a PCC rule obtained from a PCRF).

S410: The AMF sends a data response message to the NWDAF.

The AMF feeds back the obtained 4G network data to the NWDAF by using the data response message.

For example, the AMF may invoke an Namf_EventExposure_Notify service to feed back the obtained 4G network data to the NWDAF.

S411: The NWDAF performs data analysis.

For example, the NWDAF performs a corresponding data analysis task based on the obtained 4G network data, to obtain a data analysis result.

S412: The NWDAF sends the data analysis result to the consumer network element.

For example, the NWDAF may invoke an Nnwdaf_analysticsSubscription Notify service to feed back the data analysis result to the consumer.

In FIG. 4, the data obtaining method provided in this application is described by using an example in which the first network element is the AMF network element in the 5G network (or referred to as the 5G AMF instance) and the second network element is the MME network element in the 4G network (or referred to as the 4G MME instance). The following describes, with reference to FIG. 5, the data obtaining method provided in this application by using an example in which a first network element is an SMF network element in the 5G network (or referred to as a 5G SMF instance) and a second network element is a PGW-C network element in the 4G network (or referred to as a 4G PGW-C instance).

Figure 5:
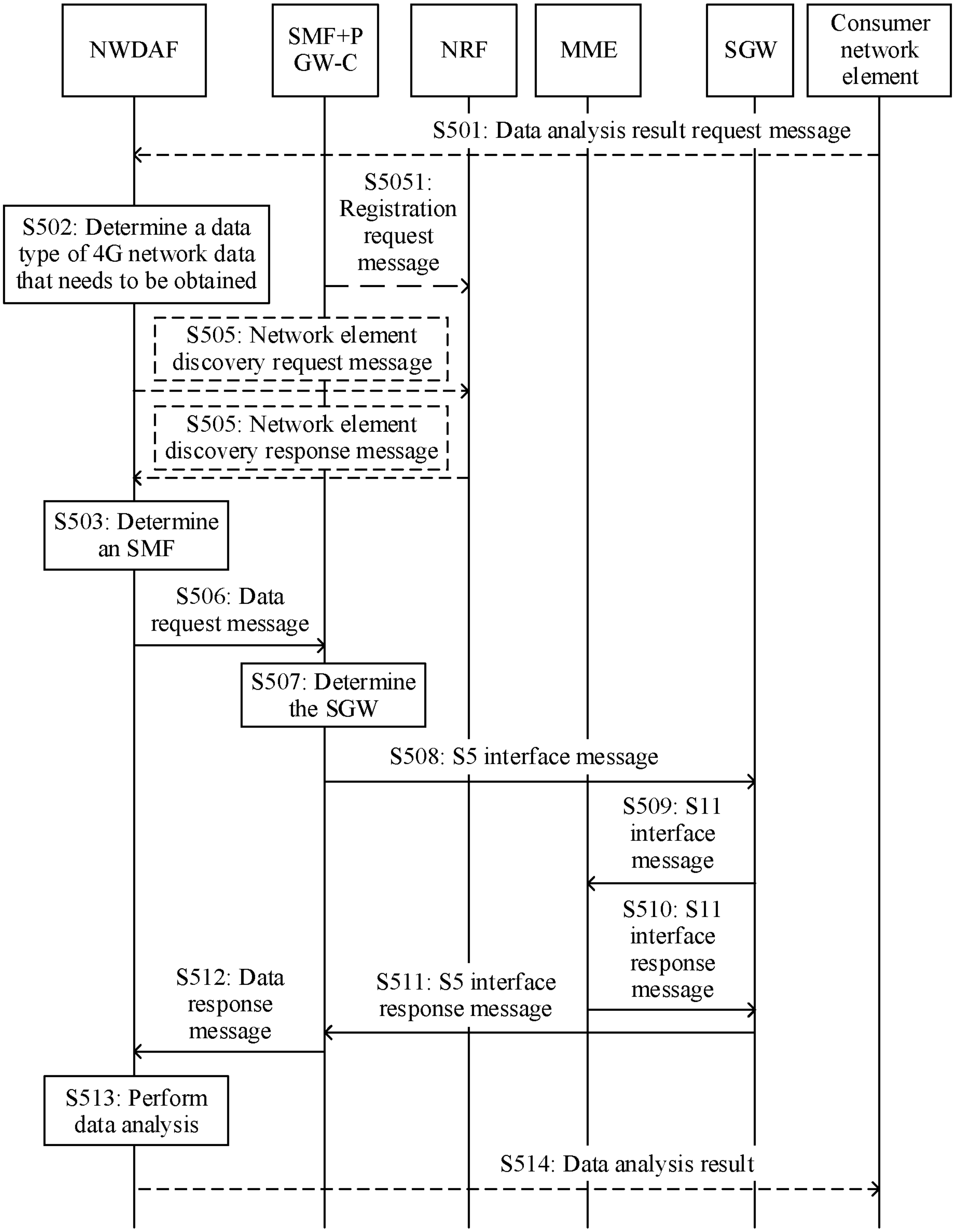
FIG. 5 is a schematic flowchart of still another data obtaining method according to an embodiment of this application.

FIG. 5 is a schematic flowchart of still another data obtaining method according to an embodiment of this application.

The data obtaining method includes at least some of the following steps.

S501: An NWDAF receives a data analysis result request message from a consumer network element (consumer), or the consumer network element sends the data analysis result request message to the NWDAF.

This step is the same as S401 in FIG. 4, and details are not described herein again.

S502: The NWDAF determines a data type of 4G network data that needs to be obtained.

This step is the same as S402 in FIG. 4, and details are not described herein again.

S503: The NWDAF determines an SMF.

This step is similar to S403 in FIG. 4, and a difference is that in the embodiment shown in FIG. 5, the NWDAF determines the SMF, but in the embodiment shown in FIG. 4, the NWDAF determines the AMF.

For a specific determining manner, refer to descriptions in S403. Details are not described herein again.

In a process of determining the SMF, the NWDAF may obtain, from an NRF, a network element instance corresponding to a 5G network element type. The method procedure shown in FIG. 5 further includes the following steps.

S504: The NWDAF sends a network element discovery request message to the NRF.

This step is the same as S404 in FIG. 4, and details are not described herein again.

S5041: The SMF sends a registration request message to the NRF.

For example, the registration request message may be that the SMF invokes an Nnrf_NFManagement_NFRegister service.

The registration request message is used to register attribute information of the SMF (an NF profile, including a 5G serving area served by the SMF) with the NRF. In this registration procedure, the SMF registers, with the NRF, a 4G serving area corresponding to the 5G serving area of the SMF.

S505: The NRF sends a network element discovery response message to the NWDAF.

This step is the same as S405 in FIG. 4, and details are not described herein again.

S506: The NWDAF sends a data request message to the SMF.

The sent data request message is used to request the 4G network data.

Specifically, the data request message may be that the NWDAF invokes an Nsmf_EventExposure_subscription service of the SMF.

For example, the data request message includes an MME ID or an MME address, and an SGW ID or an SGW address.

Information included in the sent data request message is similar to information included in the data request message sent by the NWDAF to the AMF shown in FIG. 4. Details are not described herein again.

S507: An SMF+PGW-C determines a 4G network element.

If the data request message sent by the NWDAF to the SMF+PGW-C does not indicate the 4G NF, the SMF+PGW-C needs to determine a 4G NF of to-be-obtained 4G network data, which is similar to S407 in FIG. 4.

A difference is that in FIG. 4, the AMF determines an MME that has an N26 interface with the AMF, but the SMF in FIG. 5 is an SMF co-located with the PGW-C. After the SMF+PGW-C is determined, the SMF+PGW-C may obtain the data request message to obtain data from another network element in the 4G network without first determining an MME that has an interface with the AMF and then obtaining the data from the another network element in the 4G network by using the MME, in the procedure shown in FIG. 4.

For ease of understanding, an example in which the 4G NF includes an MME is used for description in this embodiment of this application.

For example, that the SMF+PGW-C determines an SGW based on the data request message when the data request message sent by the NWDAF to the SMF+PGW-C does not indicate the SGW ID or the SGW address includes:

In a possible implementation, when the data request message does not include area filter information (a 4G AOI or a 5G AOI), the SMF+PGW-C may determine all SGWs as objects for obtaining the 4G data.

In another possible implementation, when the data request message includes 4G AOI filter information, the AMF further determines an SGW corresponding to a 4G AOI.

In still another possible implementation, when the data request message includes a 5G AOI, the SMF+PGW-C first obtains a 4G AOI through mapping based on the 5G AOI, and then determines a corresponding SGW based on the 4G AOI.

S508: The SMF+PGW-C sends an S5 interface message to the SGW.

The S5 interface message is used to request to obtain specific 4G network data.

Information included in the S5 interface message is similar to information included in the data obtaining request message in S408 in FIG. 4. A difference is that the S5 interface message may further include the MME ID or the MME address to indicate the SGW to obtain the 4G network data from the MME.

S509: The SGW sends an S11 interface message to the MME.

For example, that the SGW determines the MME based on the S5 interface message when the data request message sent by the NWDAF to the SMF+PGW-C does not indicate the MME ID or the MME address includes:

In a possible implementation, when the S5 interface message does not include the area filter information (the 4G AOI or the 5G AOI), the SMF+PGW-C may determine all MMEs as objects for obtaining the 4G data.

In another possible implementation, when the S5 interface message includes the 4G AOI filter information, the AMF further determines an MME corresponding to the 4G AOI.

In still another possible implementation, when the S5 interface message includes the 5G AOI, the SMF+PGW-C first obtains the 4G AOI through mapping based on the 5G AOI, and then determines a corresponding MME based on the 4G AOI.

The S11 interface message is used to request to obtain specific 4G network data. This step is similar to S408 in FIG. 4, and details are not described herein again.

S510: The MME sends an S11 interface response message to the SGW.

The MME obtains corresponding data in the 4G network based on the S11 interface message, and sends the data to the SGW by using the S11 interface response message.

S511: The SGW sends an S5 interface response message to the SMF+PGW-C.

The SGW feeds back the corresponding data in the 4G network to the SMF+PGW-C by using the S5 interface response message.

S512: The SMF+PGW-C sends a data response message to the NWDAF.

The SMF+PGW-C feeds back the obtained 4G network data to the NWDAF by using the data response message.

For example, the SMF+PGW-C may invoke an Nsmf_EventExposure_Notify service to feed back the obtained 4G network data to the NWDAF.

S513: The NWDAF performs data analysis.

This step is the same as S411 in FIG. 4, and details are not described herein again.

S514: The NWDAF sends a data analysis result to the consumer network element.

This step is the same as S412 in FIG. 4, and details are not described herein again. In the method embodiments, the sequence numbers of the foregoing processes do not mean execution sequences. The execution sequences of the processes should be determined based on functions and internal logic of the processes, and should not be construed as any limitation on the implementation processes of embodiments of this application. In addition, not all operations in the method embodiments need to be performed.

It should be understood that the terminal device and/or the network device in the foregoing method embodiments may perform some or all of the steps in this embodiment. These steps or operations are merely examples. In embodiments of this application, other operations or variants of the various operations may be further included.

It may be understood that, in the foregoing method embodiments, the methods implemented by the NWDAF may alternatively be implemented by a component (for example, a chip or a circuit) that can be used in the NWDAF, and the methods implemented by the first network element may alternatively be implemented by a component that can be used in the first network element.

It should further be understood that, in embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail the data obtaining method in embodiments of this application with reference to FIG. 3 to FIG. 5. The following describes in detail data obtaining apparatuses provided in embodiments of this application with reference to FIG. 6 to FIG. 11.

Figure 6:
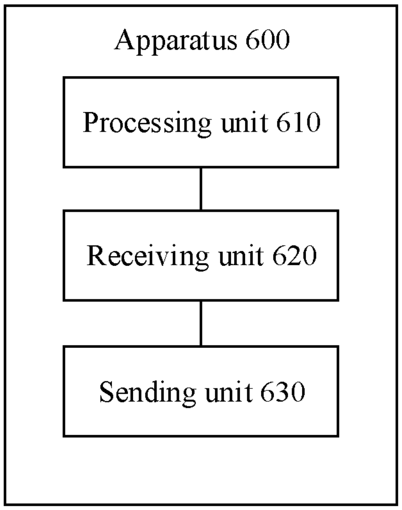
FIG. 6 is a schematic diagram of a data obtaining apparatus 600 according to this application.

FIG. 6 is a schematic diagram of a data obtaining apparatus 600 according to this application. As shown in FIG. 6, the apparatus 600 is located in a first network, and the apparatus 600 includes a processing unit 610, a receiving unit 620, and a sending unit 630.

The processing unit 610 is configured to determine to-be-analyzed data in a second network.

The sending unit 630 is configured to send a first request message to a first network element in the first network. The first request message is used to request to obtain the to-be-analyzed data. The first request message includes first indication information. The first indication information indicates that the to-be-analyzed data belongs to the second network.

For example, the processing unit is further configured to determine the first network element, and the first network element is configured to obtain the to-be-analyzed data from the second network.

For example, that the processing unit determines data type information corresponding to the to-be-analyzed data includes:

The processing unit determines, based on identification information, the data type information corresponding to the to-be-analyzed data, and the identification information indicates a type of a data analysis task performed by the processing unit.

For example, the receiving unit 620 is configured to receive a second request message from a consumer network element, and the second request message is used to request the processing unit to perform data analysis.

The second request message includes the identification information.

The processing unit alternatively determines the identification information based on a pre-configured task, and the pre-configured task indicates a data analysis type corresponding to the identification information.

For example, that the processing unit determines the to-be-analyzed data in the second network includes:

The processing unit determines, based on second indication information, that to-be-obtained data includes the to-be-analyzed data in the second network.

For example, that the processing unit determines the first network element includes:

The processing unit determines network element type information of the first network element.

The processing unit determines the first network element based on the network element type information of the first network element.

For example, that the processing unit determines the first network element includes:

The processing unit determines that the first network element meets a preset condition, and the preset condition includes at least one of the following:

- having an interaction interface with a network element in the second network, being co-located with the network element in the second network, and area information corresponding to the second network.

For example, that the processing unit determines the first network element includes:

The sending unit sends a third request message to a network repository function network element in the first network. The third request message is used to request the network repository function network element to provide information about the first network element, and the third request message includes the preset condition.

The receiving unit receives a third response message from the network repository function network element, and the third response message includes the information about the first network element.

The apparatus 600 corresponds to a data analysis network element in the first network in the method embodiments. The apparatus 600 may be the data analysis network element in the method embodiments, or a chip or a functional module inside the data analysis network element in the method embodiments. Corresponding units of the apparatus 600 are configured to perform corresponding steps performed by the data analysis network element in the method embodiment shown in FIG. 3.

The processing unit 610 in the apparatus 600 is configured to perform processing-related steps corresponding to the data analysis network element in the method embodiments. The receiving unit 620 in the apparatus 600 performs a step of receiving by the data analysis network element in the method embodiments. The sending unit 630 in the apparatus 600 is configured to perform a step of sending by the data analysis network element.

The receiving unit 620 and the sending unit may form a transceiver unit that has both receiving and sending functions. The processing unit 610 may be at least one processor. The sending unit may be a transmitter or an interface circuit, and the receiving unit 620 may be a receiver or an interface circuit. The receiver and the transmitter may be integrated together to form a transceiver or an interface circuit.

Optionally, the apparatus 600 may further include a storage unit, configured to store data and/or signaling. The processing unit 610, the sending unit, and the receiving unit 620 may interact with or be coupled to the storage unit, for example, read or invoke the data and/or signaling in the storage unit, so that the methods in the foregoing embodiments are performed.

The foregoing units may exist independently, or may be all or partially integrated.

Figure 7:
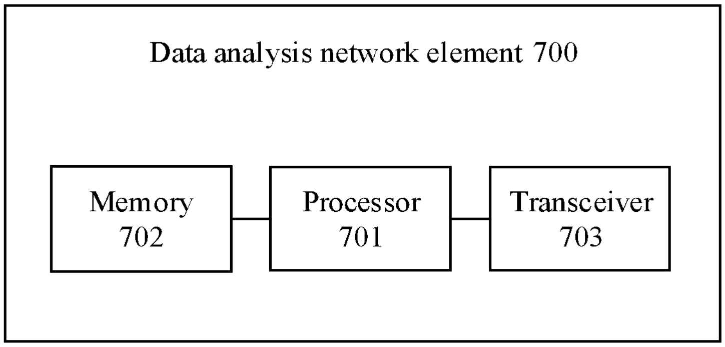
FIG. 7 is a schematic diagram of a structure of a data analysis network element 700 applicable to an embodiment of this application.

FIG. 7 is a schematic diagram of a structure of a data analysis network element 700 applicable to an embodiment of this application. The data analysis network element 700 may be configured to implement a function of the foregoing data analysis network element.

The data analysis network element 700 includes a processor 701, a memory 702, and a transceiver 703. The memory 702 stores instructions or a program. The processor 702 and the transceiver 703 are configured to execute or invoke the instructions or the program stored in the memory 702, so that the data analysis network element 700 implements the function of the data analysis network element used in the foregoing data obtaining method. When the instructions or the program stored in the memory 702 is executed, the transceiver 703 is configured to perform operations performed by the sending unit 630 and the receiving unit 620 in the embodiment shown in FIG. 6, and the processor 701 is configured to perform an operation performed by the processing unit 610 in the embodiment shown in FIG. 6.

A person skilled in the art may understand that, for ease of description, FIG. 7 shows only one memory and one processor. There may be a plurality of processors and a plurality of memories in actual user equipment. The memory may also be referred to as a storage medium, a storage device, or the like. This is not limited in embodiments of this application.

Figure 8:
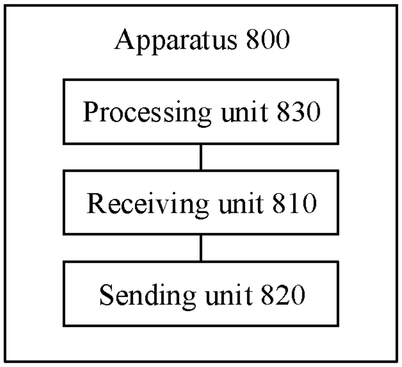
FIG. 8 is a schematic diagram of another data obtaining apparatus 800 according to this application.

FIG. 8 is a schematic diagram of another data obtaining apparatus 800 according to this application. As shown in FIG. 8, the apparatus 800 is located in a first network, and the apparatus 800 includes a receiving unit 810, a sending unit 820, and a processing unit 830.

The receiving unit 810 is configured to receive a first request message from a data analysis network element. The first request message is used to request to obtain to-be-analyzed data, the first request message includes first indication information, and the first indication information indicates that the to-be-analyzed data belongs to a second network.

The processing unit 830 is configured to obtain the to-be-analyzed data from a second network element in the second network based on the first indication information.

The second network element includes a network element having an interaction interface with a first network element, and/or a network element co-located with the first network element in the second network.

For example, the apparatus further includes:

The sending unit 820 is configured to send a registration request message to a network repository function network element in the first network. The registration request message includes at least one of the following information:

area information corresponding to the second network, area information corresponding to the first network, information about the interaction interface between the second network element and the first network element, or information about the second network element co-located with the first network element.

For example, the processing unit is further configured to determine that the second network element is a network element meeting a preset condition in the second network.

The preset condition includes at least one of the following:

having the interaction interface with the first network element, being co-located with the first network element, and being associated with the area information corresponding to the second network.

For example, the receiving unit is further configured to receive the to-be-analyzed data from the second network element.

The sending unit is configured to send the to-be-analyzed data to the data analysis network element.

The apparatus 800 corresponds to the first network element (for example, an AMF or an SMF) in the method embodiments. The apparatus 800 may be the first network element in the method embodiments, or a chip or a function module inside the first network element in the method embodiments. Corresponding units of the apparatus 800 are configured to perform corresponding steps performed by the first network element in the method embodiment shown in FIG. 3.

The sending unit 820 in the apparatus 800 performs a step of sending by the first network element in the method embodiments. The receiving unit 810 in the apparatus 800 is configured to perform a step of receiving by the first network element. The apparatus 800 may further include the processing unit 830, configured to perform a corresponding processing-related step in the first network element.

Optionally, the apparatus 800 may further include a storage unit, configured to store data and/or signaling. The processing unit 830, the sending unit 820, and the receiving unit 810 may interact with or be coupled to the storage unit, for example, read or invoke the data and/or signaling in the storage unit, so that the methods in the foregoing embodiments are performed.

The foregoing units may exist independently, or may be all or partially integrated.

Figure 9:
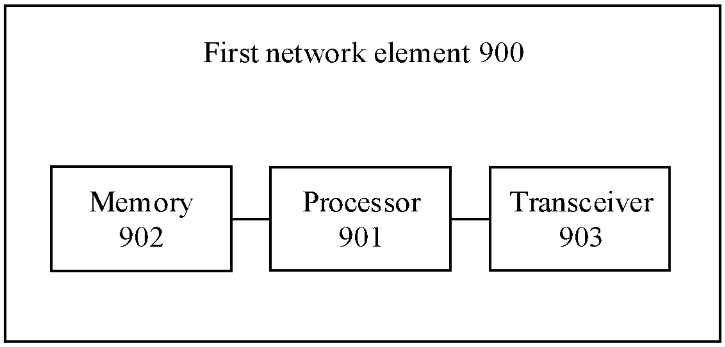
FIG. 9 is a schematic diagram of a structure of a first network element 900 applicable to an embodiment of this application.

FIG. 9 is a schematic diagram of a structure of a first network element 900 applicable to an embodiment of this application. The first network element 900 may be configured to implement a function of the foregoing first network element.

The first network element 900 includes a processor 901, a memory 902, and a transceiver 903. The memory 902 stores instructions or a program. The processor 901 and the transceiver 903 are configured to execute or invoke the instructions or the program stored in the memory 902, so that the first network element 900 implements the function of the first network element used in the foregoing data obtaining method. When the instructions or the program stored in the memory 902 is executed, the transceiver 903 is configured to perform operations performed by the sending unit 820 and the receiving unit 810 in the embodiment shown in FIG. 8, and the processor 901 is configured to perform an operation performed by the processing unit 830 in the embodiment shown in FIG. 8.

An embodiment of this application further provides a communication system, including the foregoing data analysis network element and the foregoing first network element.

This application further provides a computer-readable storage medium. The computer-readable storage medium stores instructions. When the instructions are run on a computer, the computer is enabled to perform the steps performed by the data analysis network element in the method shown in FIG. 3.

This application further provides a computer-readable storage medium. The computer-readable storage medium stores instructions. When the instructions are run on a computer, the computer is enabled to perform the steps performed by the first network element in the method shown in FIG. 3.

This application further provides a computer program product including instructions. When the computer program product runs on a computer, the computer is enabled to perform the steps performed by the data analysis network element in the method shown in FIG. 3.

This application further provides a computer program product including instructions. When the computer program product runs on a computer, the computer is enabled to perform the steps performed by the first network element in the method shown in FIG. 3.

This application further provides a chip, including a processor. The processor is configured to read and run a computer program stored in a memory, to perform a corresponding operation and/or procedure performed by the data analysis network element in the data obtaining method provided in this application. In a possible implementation, the chip further includes the memory. The memory is connected to the processor through a circuit or a wire. The processor is configured to read and execute the computer program in the memory. Further, in a possible implementation, the chip further includes a communication interface. The processor is connected to the communication interface. The communication interface is configured to receive processed data and/or information. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be a processing circuit or a logic circuit.

This application further provides a chip, including a processor. The processor is configured to read and run a computer program stored in a memory, to perform a corresponding operation and/or procedure performed by the first network element in the data obtaining method provided in this application. In a possible implementation, the chip further includes the memory. The memory is connected to the processor through a circuit or a wire. The processor is configured to read and execute the computer program in the memory. Further, in a possible implementation, the chip further includes a communication interface. The processor is connected to the communication interface. The communication interface is configured to receive processed data and/or information. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be a processing circuit or a logic circuit.

The foregoing chip may alternatively be replaced with a chip system, and details are not described herein again.

In this application, the terms "include", "have", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In addition, the term "and/or" in this application s only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data obtaining method, comprising:

determining, by a data analysis network element in a first network, to-be-analyzed data in a second network; and sending, by the data analysis network element, a first request message to a first network element in the first network, wherein the first request message comprises a request to obtain the to-be-analyzed data, the first request message comprises first indication information, and the first indication information indicates that the to-be-analyzed data belongs to the second network, and wherein the first indication information comprises a second type identifier indicating a data type of the to-be-analyzed data in the second network, wherein the second type identifier is different from a first type identifier indicating the same data type in the first network.

2. The method according to claim 1, wherein the first indication information further comprises at least one of the following information:

network type information of the second network, network identification information of the second network, area information corresponding to the second network, or information about a second network element in the second network, wherein the second network element is configured to provide the to-be-analyzed data.

3. The method according to claim 1, wherein the method comprises:

determining, by the data analysis network element, the first network element, wherein the first network element is configured to obtain the to-be-analyzed data from the second network.

4. The method according to claim 3, wherein the determining, by the data analysis network element, the first network element comprises:

determining, by the data analysis network element, data type information of the to-be-analyzed data; and determining, by the data analysis network element, the first network element based on the data type information.

5. The method according to claim 4, wherein the determining, by the data analysis network element, data type information of the to-be-analyzed data comprises:

determining, by the data analysis network element based on identification information, the data type information of the to-be-analyzed data, wherein the identification information indicates a type of a data analysis task performed by the data analysis network element.

6. The method according to claim 5, wherein the method further comprises:

receiving, by the data analysis network element, a second request message from a consumer network element, wherein the second request message comprises a request the data analysis network element to perform data analysis, and the second request message comprises the identification information; or determining, by the data analysis network element, the identification information based on a pre-configured task, wherein the pre-configured task indicates a data analysis type corresponding to the identification information.

7. The method according to claim 6, wherein the second request message further comprises second indication information, and the second indication information indicates at least one of the following:

area information corresponding to the second network, network type information of the second network, or network identification information of the second network.

8. The method according to claim 3, wherein the determining, by the data analysis network element, the first network element comprises:

determining, by the data analysis network element, the first network element based on a preset condition, wherein the first network element meets the preset condition, and the preset condition comprises at least one of the following:

having an interaction interface with a network element in the second network, being co-located with the network element in the second network, or being associated with area information corresponding to the second network.

9. The method according to claim 1, wherein the second type identifier or the first type identifier indicates that the data type is at least one of mobility-related data, session-related data, policy and charging-related data, or quality of service-related data.

10. A data obtaining method, comprising:

receiving, by a first network element in a first network, a first request message from a data analysis network element, wherein the first request message comprises a request to obtain to-be-analyzed data, the first request message comprises first indication information, and the first indication information indicates that the to-be-analyzed data belongs to a second network, and wherein the first indication information comprises a second type identifier indicating a data type of the to-be-analyzed data in the second network, wherein the second type identifier is different from a first type identifier indicating the same data type in the first network; and obtaining, by the first network element, the to-be-analyzed data from a second network element in the second network based on the first indication information, wherein the second network element comprises a network element having at least one of an interaction interface with the first network element or a network element co-located with the first network element.

11. The method according to claim 10, wherein the method further comprises:

sending, by the first network element, a registration request message to a network repository function network element in the first network, wherein the registration request message comprises at least one of the following information:

area information corresponding to the second network, area information corresponding to the first network, information about the interaction interface between the first network element and the second network element, or information about the second network element co-located with the first network element.

12. The method according to claim 10, wherein the method further comprises:

determining, by the first network element, that the second network element is a network element meeting a preset condition in the second network, wherein the preset condition comprises at least one of the following:

having the interaction interface with the first network element, being co-located with the first network element, or being associated with area information corresponding to the second network.

13. A data obtaining apparatus, wherein the apparatus is located in a first network, and the apparatus comprises:

at least one processor; and one or more memories coupled to the at least one processor and storing programming instructions for execution by the at least one processor to cause the apparatus to:

determine to-be-analyzed data in a second network; and send a first request message to a first network element in the first network, wherein the first request message comprises a request to obtain the to-be-analyzed data, the first request message comprises first indication information, and the first indication information indicates that the to-be-analyzed data belongs to the second network, and wherein the first indication information comprises a second type identifier indicating a data type of the to-be-analyzed data in the second network, wherein the second type identifier is different from a first type identifier indicating the same data type in the first network.

14. The apparatus according to claim 13, wherein the first indication information further comprises at least one of the following information:

network type information of the second network, network identification information of the second network, area information corresponding to the second network, or information about a second network element that provides the to-be-analyzed data, wherein the second network element is in the second network.

15. The apparatus according to claim 13, wherein the programming instructions, when executed by the at least one processor, cause the apparatus to: determine the first network element that obtains the to-be-analyzed data from the second network.

16. The apparatus according to claim 15, wherein the programming instructions, when executed by the at least one processor, cause the apparatus to:

determine data type information of the to-be-analyzed data; and determine the first network element based on the data type information.

17. The apparatus according to claim 16, wherein the programming instructions, when executed by the at least one processor, cause the apparatus to:

determine, based on identification information, the data type information of the to-be-analyzed data, wherein the identification information indicates a type of a data analysis task.

18. The apparatus according to claim 17, wherein the programming instructions, when executed by the at least one processor, cause the apparatus to:

receive a second request message from a consumer network element, wherein the second request message comprises a request to perform data analysis, wherein the second request message comprises the identification information; or determines the identification information based on a pre-configured task, wherein the pre-configured task indicates a data analysis type corresponding to the identification information.

19. The apparatus according to claim 18, wherein the second request message further comprises second indication information, and the second indication information indicates at least one of the following:

area information corresponding to the second network, network type information of the second network, or network identification information of the second network.

20. The apparatus according to claim 15, wherein the programming instructions, when executed by the at least one processor, cause the apparatus to:

determine that the first network element meets a preset condition, wherein the preset condition comprises at least one of the following:

having an interaction interface with a network element in the second network, being co-located with the network element in the second network, or being associated with area information corresponding to the second network.

* * * * *